US012729664B2

(12) United States Patent
Ezzat et al.

(10) Patent No.: US 12,729,664 B2
(45) Date of Patent: Sep. 8, 2026

(54) TECHNIQUES TO PROVIDE IMPROVED WIND INPUT FOR OPERATING OFFSHORE WIND TURBINES

(71) Applicant: RUTGERS, THE STATE UNIVERSITY OF NEW JERSEY, New Brunswick, NJ (US)

(72) Inventors: Ahmed Aziz Ezzat, East Brunswick, NJ (US); Feng Ye, Piscataway, NJ (US); Joseph F. Brodie, Ephrata, NJ (US); Travis Miles, Jersey City, NJ (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 0 days.

(21) Appl. No.: 19/111,467

(22) PCT Filed: Sep. 10, 2023

(86) PCT No.: PCT/US2023/073816

§ 371 (c)(1),
(2) Date: Mar. 13, 2025

(87) PCT Pub. No.: WO2024/059479

PCT Pub. Date: Mar. 21, 2024

(65) Prior Publication Data

US 2026/0092593 A1 Apr. 2, 2026

Related U.S. Application Data

(60) Provisional application No. 63/407,573, filed on Sep. 16, 2022.

(51) Int. Cl.

*F03D 7/04* (2006.01)
*F03D 17/00* (2016.01)

(Continued)

(52) U.S. Cl.

CPC .......... *F03D 7/048* (2013.01); *F03D 17/014* (2023.08); *F03D 80/405* (2023.08); *G01W 1/10* (2013.01);

(Continued)

(58) Field of Classification Search

None

See application file for complete search history.

(56) References Cited

U.S. PATENT DOCUMENTS

| | | | | |
|---|---|---|---|---|
| 8,930,299 B2 * | 1/2015 | Pyle | G01W 1/10 706/52 | |
| 2004/0169376 A1 * | 9/2004 | Ruer | E02D 27/425 290/55 | |

(Continued)

OTHER PUBLICATIONS

International Preliminary Report on Patentability received for PCT Patent Application No. PCT/US23/73816, mailed on Mar. 27, 2025, 8 pages.

(Continued)

*Primary Examiner* — Juan G Flores

(74) *Attorney, Agent, or Firm* — Wolter Van Dyke Davis, PLLC; Eugene Molinelli

(57) ABSTRACT

Techniques for operating a wind farm include setting an area of interest, a forecast interval, and a maximum lag time for using mesoscale forecasts. Mesoscale forecasts are collected for a training time interval TT at model grid locations. TT is at least ten times the maximum lag time. Fine-scale wind measurements are collected in the area during TT. Selected parameters of the mesoscale forecasts, and coefficients of an evolving ML forecast model are determined based on the mesoscale forecasts and the fine-scale wind measurements during the TT ending at the current time. Then, the coefficients and the mesoscale forecast for the selected parameters during the lag time produce a forecast wind at the wind (Continued)

turbines during the forecast interval. Operation of the wind farm is based on the forecast wind.

20 Claims, 16 Drawing Sheets

(51) Int. Cl.
*F03D 80/40* (2016.01)
*G01W 1/10* (2006.01)

(52) U.S. Cl.
CPC ..... *F05B 2270/32* (2013.01); *F05B 2270/335* (2013.01)

(56) References Cited

U.S. PATENT DOCUMENTS

| | | | | |
|---|---|---|---|---|
| 2012/0185414 | A1* | 7/2012 | Pyle | G01W 1/10 703/2 |
| 2013/0025522 | A1* | 1/2013 | Prins | B63B 25/006 114/259 |
| 2016/0333855 | A1 | 11/2016 | Lund et al. | |
| 2020/0141392 | A1 | 5/2020 | Damgaard et al. | |
| 2022/0056890 | A1* | 2/2022 | Baun | F03D 1/02 |
| 2022/0128034 | A1* | 4/2022 | Krogenes | F03D 13/40 |

OTHER PUBLICATIONS

International search Report and written opinion received for PCT application No. PCT/US23/073816, mailed on Jan. 24, 2024, 9 pages.

* cited by examiner

FORM OF PHYSICS/STATISTIC ML FORECAST MODEL
300

$$y(\mathbf{s}_i, t) = \mu(\mathbf{s}_i, t; \boldsymbol{\theta}^{\mu}) + \eta(\mathbf{s}_i, t; \boldsymbol{\theta}^{\eta}) + \epsilon(\mathbf{s}_i, t; \boldsymbol{\theta}^{\epsilon})$$

Wind Speed

Large-scale variability

Finer-scale variability

Random error, i.e., unexplained variability

MESOSCALE
(1 TO 1000 KM,
6 TO 96 HOURS)

FINESCALE
(0 TO 1 KM,
1 MIN TO 6 HOURS)

761

START

DIRECTION CHANGE GREATER THAN THRESHOLD FOR TIME PERIOD OF INTEREST

731

Y

REORIENT YAW OF WIND TURBINE

733

N

SPEED LOWER THAN THRESHOLD FOR SERVICE FOR A TURBINE DUE FOR SERVICING

741

Y

SEND MOBILE SERVICING PLATFORM

743

N

DETERMINE NET OUTPUT OF TURBINE FARM

745

CONDITION GRID TO ACCEPT OUTPUT OF WIND FARM

753

FAULT DETECTED

751

N

Y

REMEDIATE OR CORRECT FOR FAULT

755

ICE DETECTED

757

N

Y

REMEDIATE OR CORRECT FOR ICE

759

END

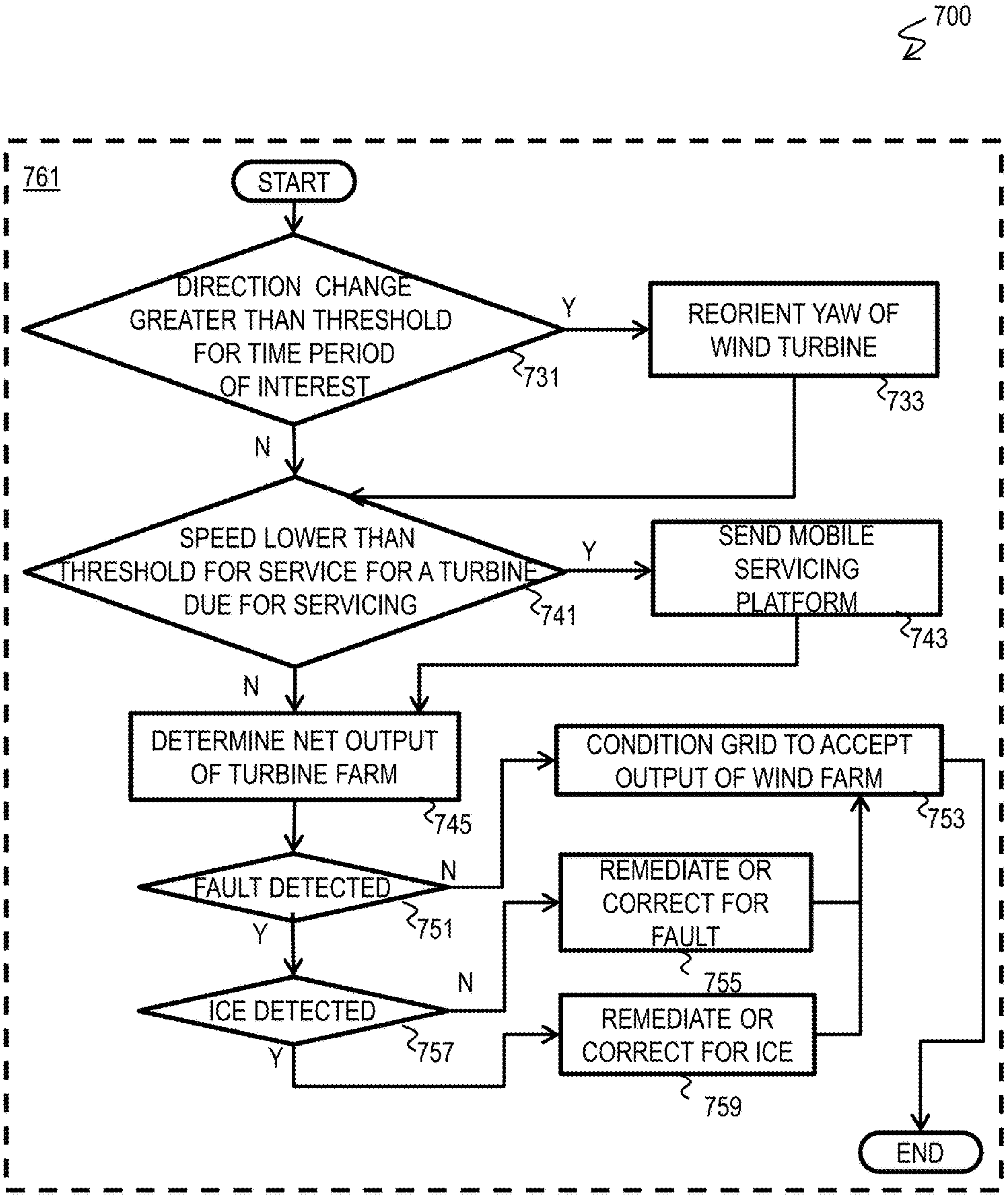

FIG.7

TECHNIQUES TO PROVIDE IMPROVED WIND INPUT FOR OPERATING OFFSHORE WIND TURBINES

CROSS-REFERENCE TO RELATED APPLICATIONS

This application is National Stage entry of PCT/US23/73816, filed Sep. 10, 2023, which claims benefit of Provisional Appln. 63/407,573, filed Sep. 16, 2022, the entire contents of which are hereby incorporated by reference as if fully set forth herein, under 35 U.S.C. § 119(e).

STATEMENT OF GOVERNMENTAL INTEREST

This invention was made with government support under Contract No. 2114422 awarded by the National Science Foundation. The government has certain rights in the invention.

BACKGROUND

Electricity system operators largely rely on wind power forecasts to inform the scheduling and planning of the electricity grid. Electricity from wind is not produced at will, but, instead, is fully dependent on the state of the weather, which in turn exhibits considerable variations both spatially and temporally. As a result, electricity system operators need to anticipate ahead of time the supply of electricity from wind energy farms in order to reliably and cost-effectively balance the supply and demand of electricity. As larger amounts of wind power continues to penetrate our electricity systems, and with wind turbines increasing in scale and sophistication (e.g., reaching over 200 m hub-height, over 200 m rotor diameter, over 12 Megawatt, MW, capacity, where 1 MW=$10^6$ watts, and farms of over 100 turbines), the value of accurate high-resolution wind forecasting continues to grow.

The reliable and cost-effective operation and integration of wind energy farms into modern-day power systems largely relies on accurate short-term predictions (e.g., minutes to days ahead) of the wind resource and wind generation at locations of wind farms and/or individual turbines.

Existing methods for wind forecasting can be broadly classified into two main clusters. In cluster 1, physics-based models and their post-processed versions are used, which do not fully unleash the power of artificial intelligence/machine learning (AI/ML) capabilities. In cluster 2, purely data-driven, black-box AI/ML/statistical models are used, which do not fully leverage the underlying physics of wind field formation and propagation.

SUMMARY

Techniques are provided for producing wind input to the planning, operation or maintenance of wind turbine farms. These techniques depart from each of the two clusters described above by designing a unique "physics-guided" AI/ML architecture that combines physics-based modeling and meteorological knowledge with the power of AI/ML to effectively and efficiently downscale those physics in the form of superior forecasts at the target spatial and temporal resolutions. Validation experiments confirm that such a physics-guided approach outperforms several technologies from the two clusters above.

In a first set of embodiments, a method is provided for operating components of a wind turbine farm comprising a plurality of wind turbines, a control center, and a service platform. The method includes setting a geographic area of interest that encompasses a plurality of wind turbines in a wind turbine farm to be operated; setting a forecast time interval from a selectable current time to a forecast horizon time of interest; and, setting a maximum lag time interval for using mesoscale weather forecasts to describe wind conditions up to the horizon time of interest. The method also includes collecting mesoscale weather forecasts from a weather model for a machine learning (ML) training time interval TT at a plurality of model grid locations of interest that encompasses the geographic area of interest. The duration of the ML training time interval TT is at least ten times than the maximum lag time interval. The method further includes collecting fine-scale wind measurements at locations of two or more of the plurality of wind turbines during TT. Still further, the method includes determining selected parameters of the weather forecasts and coefficients of an evolving ML forecast model based on the mesoscale weather forecasts and the fine-scale wind measurements during the TT ending at the current time. Yet further still, the method includes using mesoscale weather forecast values for the selected parameters during the lag time interval, and the coefficients of the evolving ML forecast model, to produce a forecast wind at each location of the plurality of wind turbines at a future time during the forecast time interval after the current time. And even further still, the method also includes operating a component of the wind turbine farm based on the forecast wind at the location of at least one of the plurality of wind turbines.

In some embodiments of the first set, the forecast time interval is selected in a range from 10 minutes to 24 hours. In some embodiments of the first set, the maximum lag time interval is selected in a range from 4 hours to 24 hours. In some embodiments of the first set, the fine-scale wind measurements have a period selected in a range from 1 minute to 30 minutes. In some of the latter embodiments, the fine-scale wind measurements have a period of about 10 minutes.

In some embodiments of the first set, the selected parameters of the weather forecasts are selected from candidates that include direct output parameters air pressure, surface temperature, wind gust, relative humidity, eastward wind component, and northward wind components and also include derived parameters pressure differential and geostrophic wind. In some of these embodiments, the selected parameters of the weather forecasts are selected from one lag time for each of the candidates, wherein the lag time is selected in a range from 1 to 10 times a temporal resolution of the fine-scale wind measurements. In some of these embodiments, the one lag time for each of the candidates is the lag time most correlated with the wind speed measurement at the end of the lag time interval. In some of these embodiments, the candidate is not selected if the one lag time most correlated with the wind speed measurement at the end of the lag time interval has a correlation measure less than 0.4.

In some embodiments of the first set, the coefficients of the evolving ML forecast model include coefficients of a spatio-temporal Gaussian process model for residuals of the measured wind after the effects of the mesoscale wind and selected parameters are subtracted. In some of these embodiments, the coefficients of the spatio-temporal Gaussian process model include a mean term and variance term based at least in part on the mesoscale wind.

In some embodiments of the first set, operating the component of the wind turbine farm further includes changing an orientation of a wind turbine rotor to an average forecast wind direction, if the average forecast wind direction differs by more than a threshold from a current orientation of the wind turbine rotor. In some of these embodiments, the threshold is 7 degrees.

In some embodiments of the first set, operating the component of the wind turbine farm further includes detecting a fault in a wind turbine when power delivered by the wind turbine is less than power expected for the forecast wind. In some of these embodiments, the fault in a wind turbine is icing if the air temperature is below a first threshold and the humidity is above a second threshold.

In some embodiments of the first set, said operating the component of the wind turbine farm further comprises dispatching a servicing platform to a wind turbine due for service if the forecast wind in the geographic area of interest is below a threshold safe wind speed for the forecast time interval.

In some embodiments of the first set, said operating the component of the wind turbine farm further comprises operating the power grid to balance the supply and demand wherein the supply is based at least in part on the forecast wind.

In other sets of embodiments, a computer-readable medium, an apparatus, or a system is configured to perform the steps of one or more of the above methods.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which:

FIG. 7 is a flow diagram that illustrates an example method for performing another step of the method of FIG. 5, according to an embodiment.

DETAILED DESCRIPTION

A method and apparatus are described for operating a wind farm based on wind forecasts. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus, a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5× to 2×, for example, about 100 implies a value in a range from 50 to 200. Moreover, all ranges disclosed herein are to be understood to encompass any and all sub-ranges subsumed therein. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described below in the context of six-hour wind forecasts for planned turbine locations in United State east coast planned offshore wind farms. However, the invention is not limited to this context. In other embodiments wind forecasts of longer or shorter duration ae made for larger or smaller turbines in larger or smaller extant or planned wind farms in remote areas on land or at sea.

1. Overview

Figure 1A:
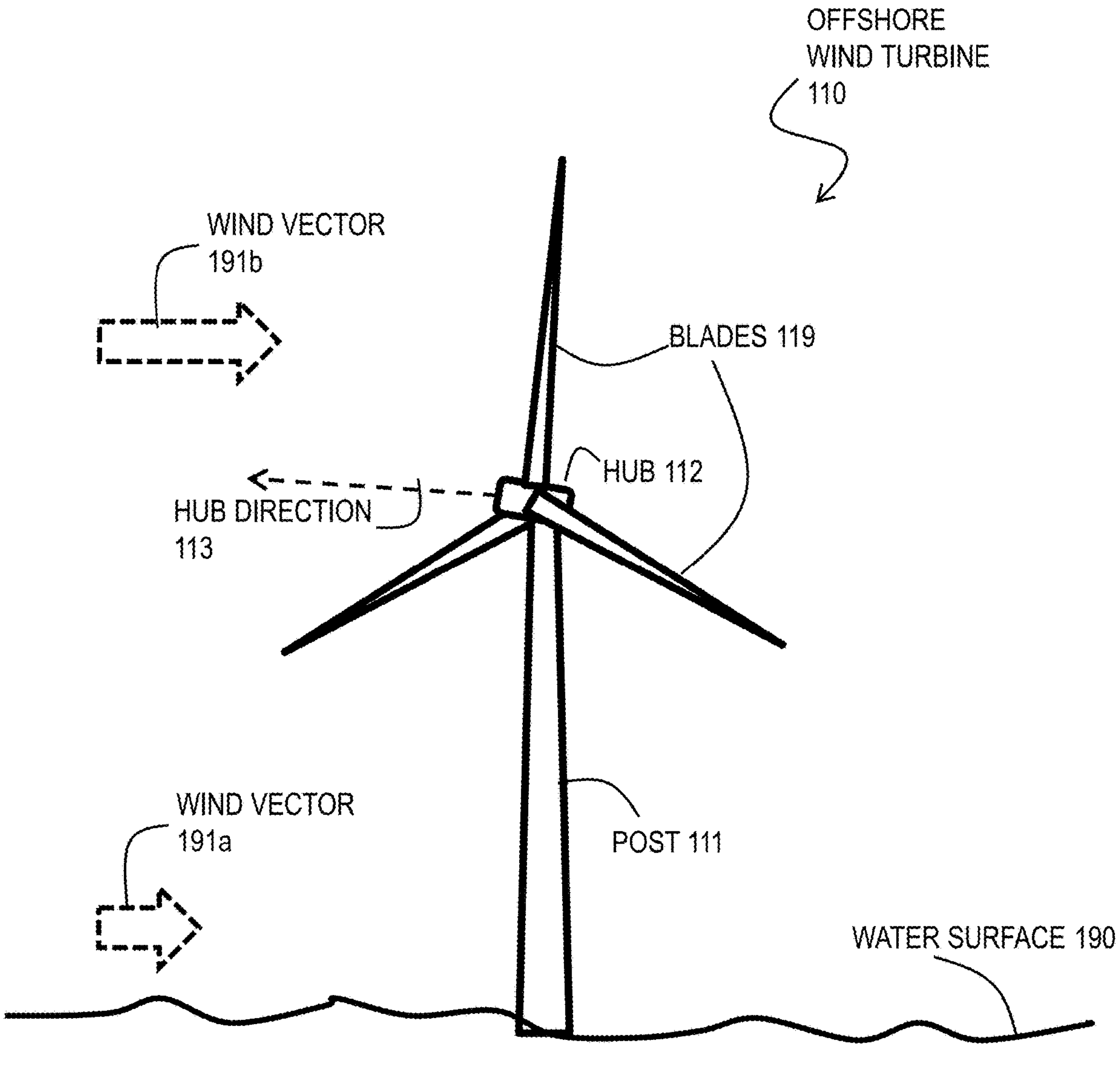
FIG. 1 A through FIG. 1C are block diagrams that illustrate components of a wind farm, according to the prior art.
Figure 1B:
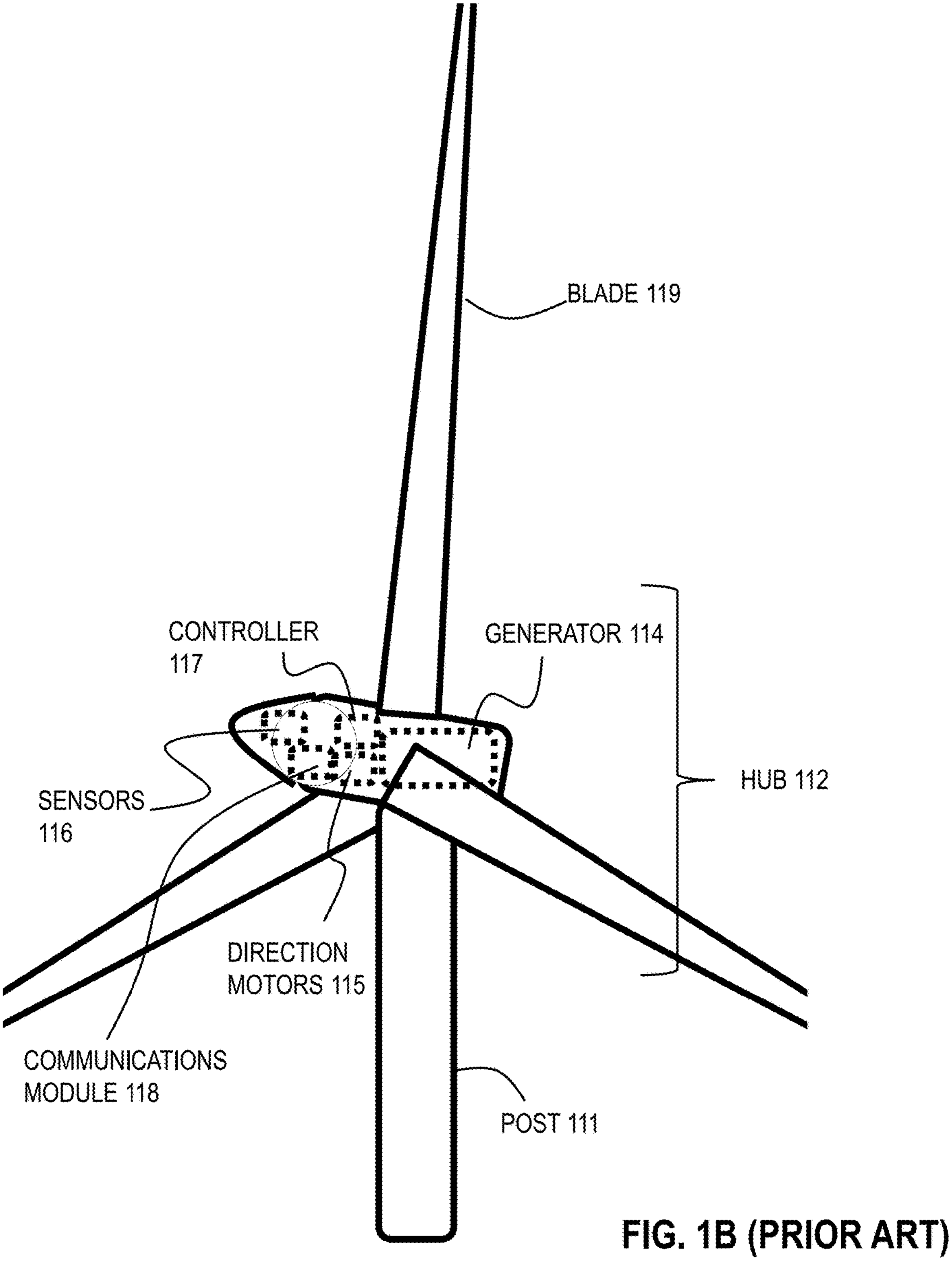
Figure 1C:
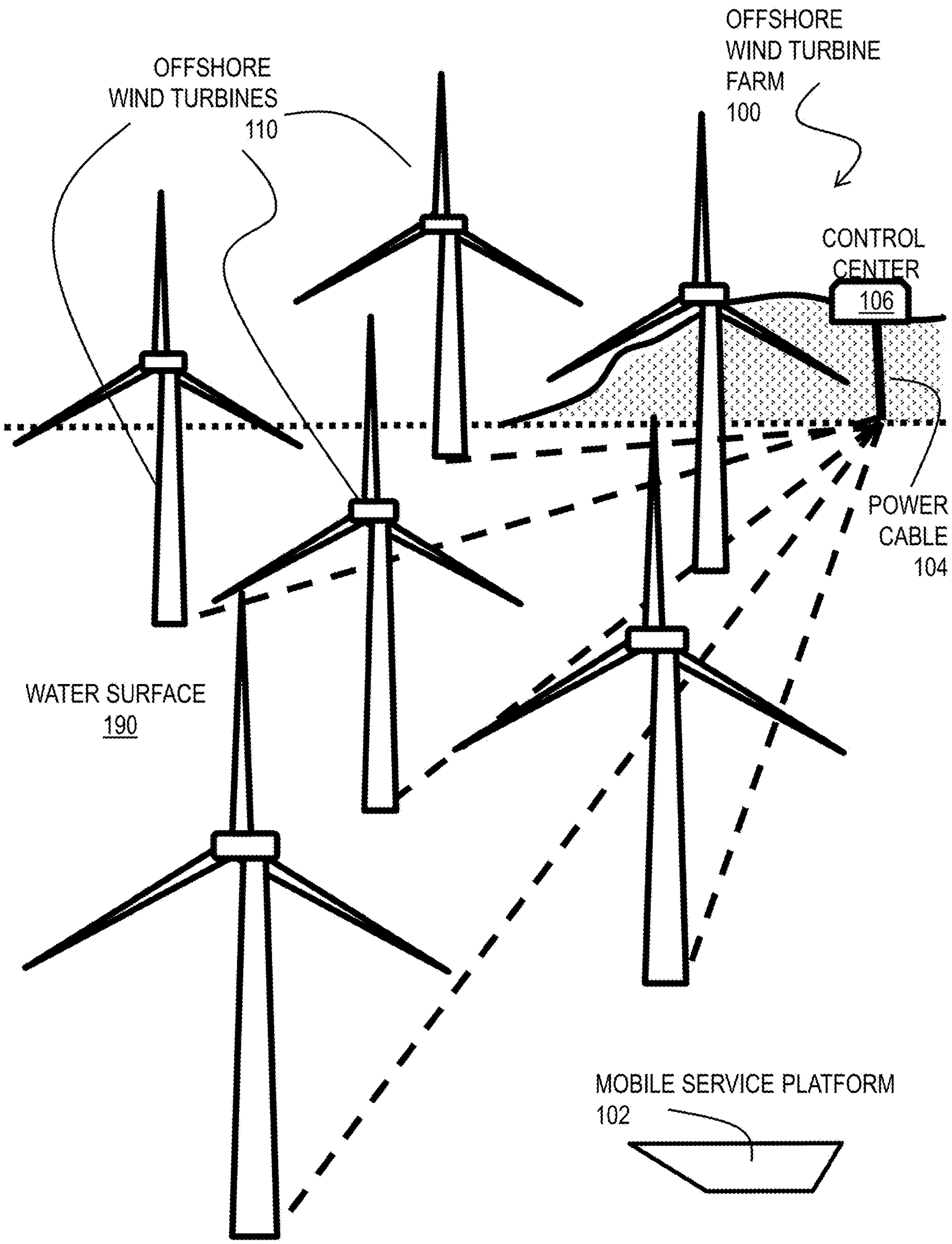

FIG. 1 A through FIG. 1C are block diagrams that illustrate components of a wind farm, according to the prior art. FIG. 1A illustrates an example offshore wind turbine 110. Although water surface 190 and wind vectors 191*a* and 191*b* are depicted in FIG. 1A, none is a component of the wind turbine 110. The wind turbine 110 includes a post 111 that supports a hub 112 at a hub height above the sea surface 190. Multiple blades 119 (typically three) attached to the hub 112 rotate around the hub 112 in response to the average wind acting on the blades 119. The rotation induced by the wind is used to power a generator inside the hub 112, which generator produces electricity for commercial or other use. The hub 112 includes a mechanism to point the hub direction 113 into the wind to maximize power transfer from wind to blades 119 and thus maximize electrical power produced by the turbine 110 . . . . Wind vectors 191*a* and 191*b* illustrate that wind speed (length of vector) tends to parallel the surface and decrease with proximity to the surface, e.g., sea surface 190. Thus, it is advantageous for the turbine to be designed so that the blades 119 engage the stronger winds aloft, such as wind vector 191*b*. Hub heights of current and future offshore wind turbines vary in a range from about 50 meters (m) to about 300 m. An example offshore wind turbine is described in more detail in Appendix A.

FIG. 1B is a block diagram that illustrates example components of a hub 112. The hub includes a generator 114 that produces electric power in response to the rotation of the blades around the hub. A portion of the hub that rotates with the blades 119 is called a rotor. Also included in or near the hub 112 are one or more of: direction motors 115, sensors 116, controller 117 and communications module 118, among others. The direction motors 115 are engaged to change the hub direction 113. The sensors 116 are configured to detect one or more environmental conditions, such as wind speed, wind direction, air temperature, humidity, among others. The controller 117 includes a processor and hardware, firmware or software programs to engage and direct the operation of the other components. The communications module 118 provides communication off turbine, e.g., to a control center, using wired or wireless communication links, such as satellite communication links, cell tower communication links, short band radio links, signals sent over or next to the power lines that carry electrical energy away from the turbine for use or storage elsewhere.

FIG. 1C illustrates an example offshore wind farm 100 that includes multiple turbines 110 that rise above the water surface 190 and feed electrical power through power cables 104 to a control center 106. The farm 100 also includes one or more dedicated or part time mobile service platforms 107 that can carry maintenance supplies and crews to individual turbines 110, on a maintenance schedule or as needed.

Figure 2A:
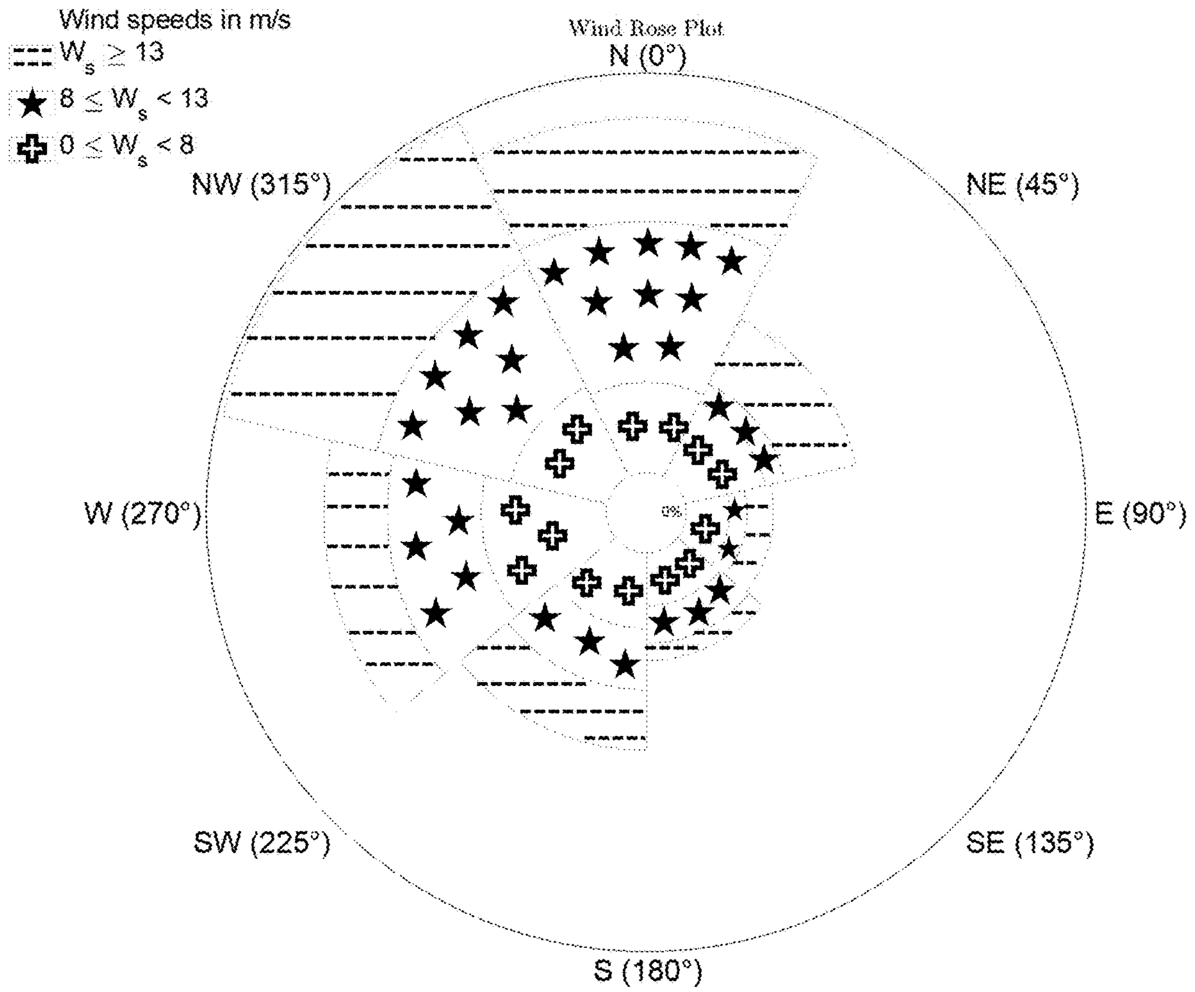
FIG. 2A is a plot that illustrates example variability in wind speed and direction at a single location, according to the prior art.

FIG. 2A is a plot that illustrates example variability in wind speed and direction at a single location, according to the prior art. The plot is a wind rose that shows the distribution of wind speed by direction in 15-degree increments of direction. The darker shades indicate the lower wind speeds and the lighter shades the higher wind speeds. The length in any direction indicates the fraction of winds that come from that direction. Wind directions indicates the direction from which the wind comes. Spot measurements like those in FIG. 2A are not widely available in remote areas, such as the areas of offshore wind farms. Spot measurements of wind are available in offshore areas from some sparsely located weather buoys and those turbines whose sensors 116 include wind speed and direction sensors. This plot is discussed in more detail with reference to FIG. 3 in Appendix B.

Figure 2B:
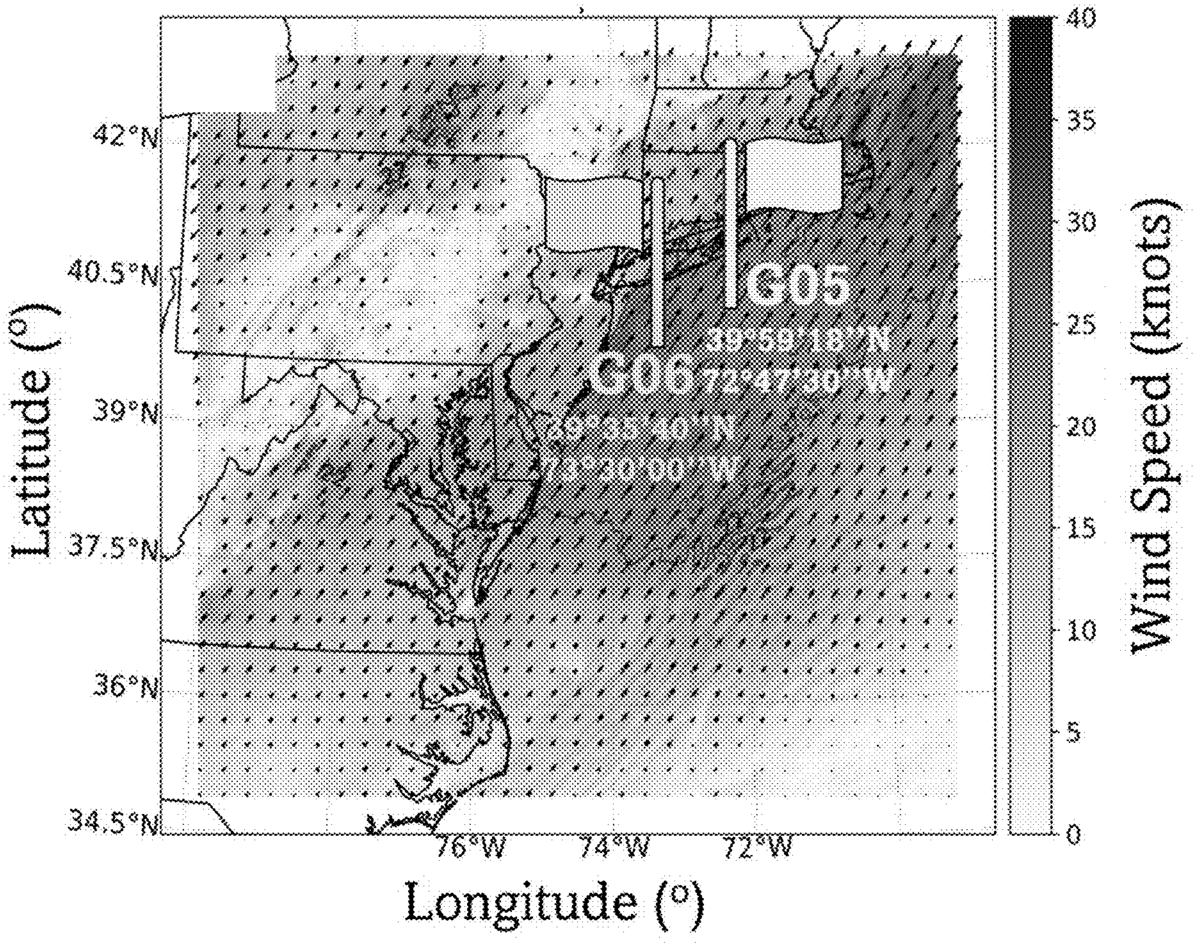
FIG. 2B is a map that illustrates variability in wind speed and direction grid points of a mesoscale forecast model, according to the prior art.

Wind forecasts, i.e., estimates of the wind speed and direction at future times for which there are not yet any measurements, are typically not available at the exact location of turbines in the wind farm or necessarily over the time scales useful for operating the turbines and other components of the farm. The most comprehensive wind forecasts currently available come from weather service mesoscale models. FIG. 2B is a map that illustrates variability in wind speed and direction at grid points of a mesoscale forecast model, according to the prior art. This plot is an example from the Rutgers University Weather Research & Forecasting model, which is a tailored version of WRF (a widely used meso-scale Numerical Weather Prediction (NWP) model). The horizontal axis indicates longitude in degrees and the vertical axis indicates latitude in degrees. The area is the continental shelf offshore of the United States east coast. The arrows are based at each model grid point and the direction of the arrow indicates the direction toward which the wind is blowing. The length of each arrow indicates the wind strength, and the darker shades represent stronger winds. These models output weather parameter values, including wind speed and direction, at grid points that may or may not coincide with the location of a wind turbine and that are so widely spaced, typically 20 kilometers (km, 1 km=$10^3$ meters) or more, that they do not represent the spatial variability between the more closely spaced turbines in the farm, which is typically less than 1 km. Even the RU-WRF model has spatial grid points 3 km to 9 km apart. Also shown in FIG. 2B are the location of two grid points G05 and G06 that are closest to two buoys which are used as spot location wind measurements for the example embodiments described in Appendix A and Appendix B This plot is discussed in more detail with reference to FIG. 2 in Appendix B.

Figure 2C:
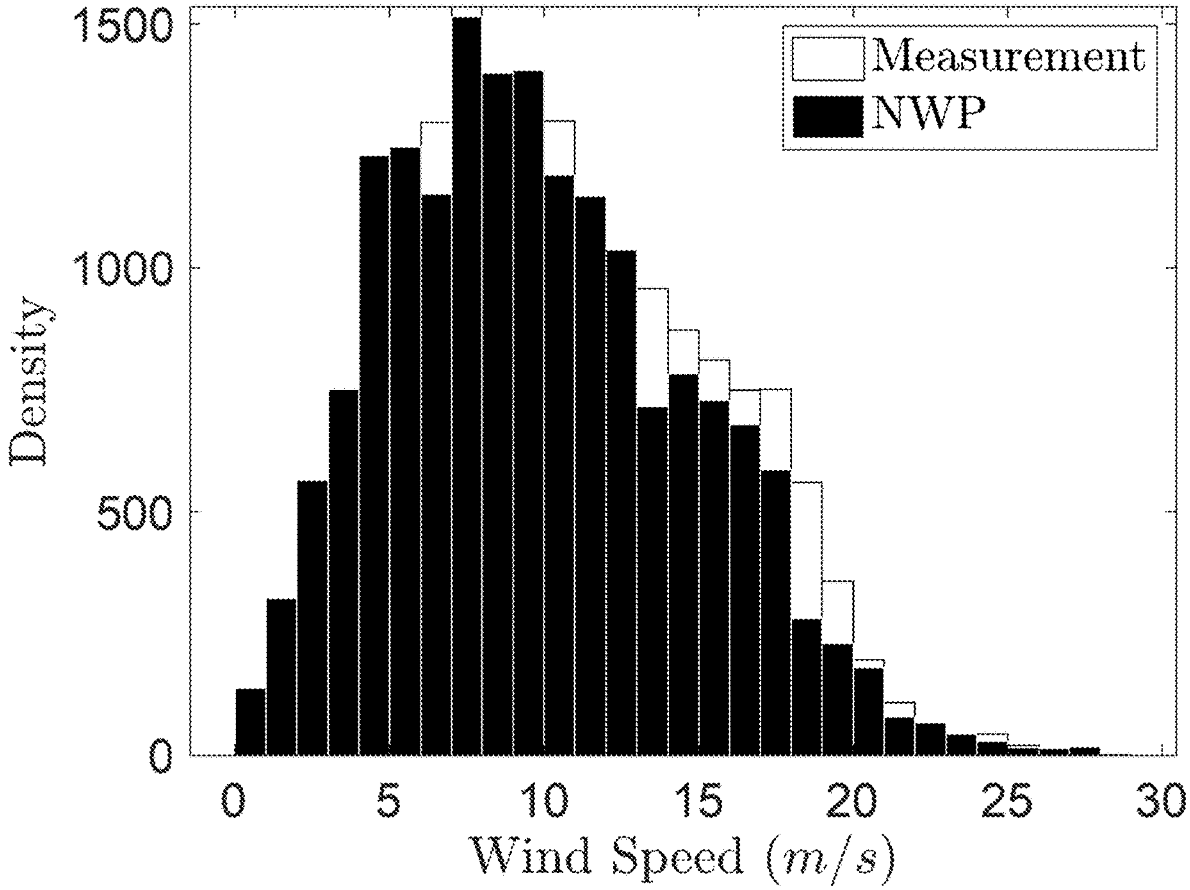
FIG. 2C is a histogram that illustrates differences invariability in wind speed between measurements at a single location and a mesoscale forecast at a nearby grid point, according to an embodiment.

FIG. 2C is a histogram that illustrates differences in variability in wind speed between measurements at a single location and a mesoscale forecast at a nearby grid point, according to an embodiment. The horizontal axis is wind speed in meters per second (m/s) and the vertical axis is dimensionless number of occurrences during an observation time interval, also called density. Data from both numerical weather prediction at the nearest grid point and the actual measurements from a buoy are plotted together. The darker shades are where both values overlap. The NWP spills off to the left and the actual measurements spill off to the right, indicating a notable bias in the NWP toward lower wind speeds than actually observed. This plot is discussed in more detail with reference to FIG. 3 in Appendix B.

Figure 2D:
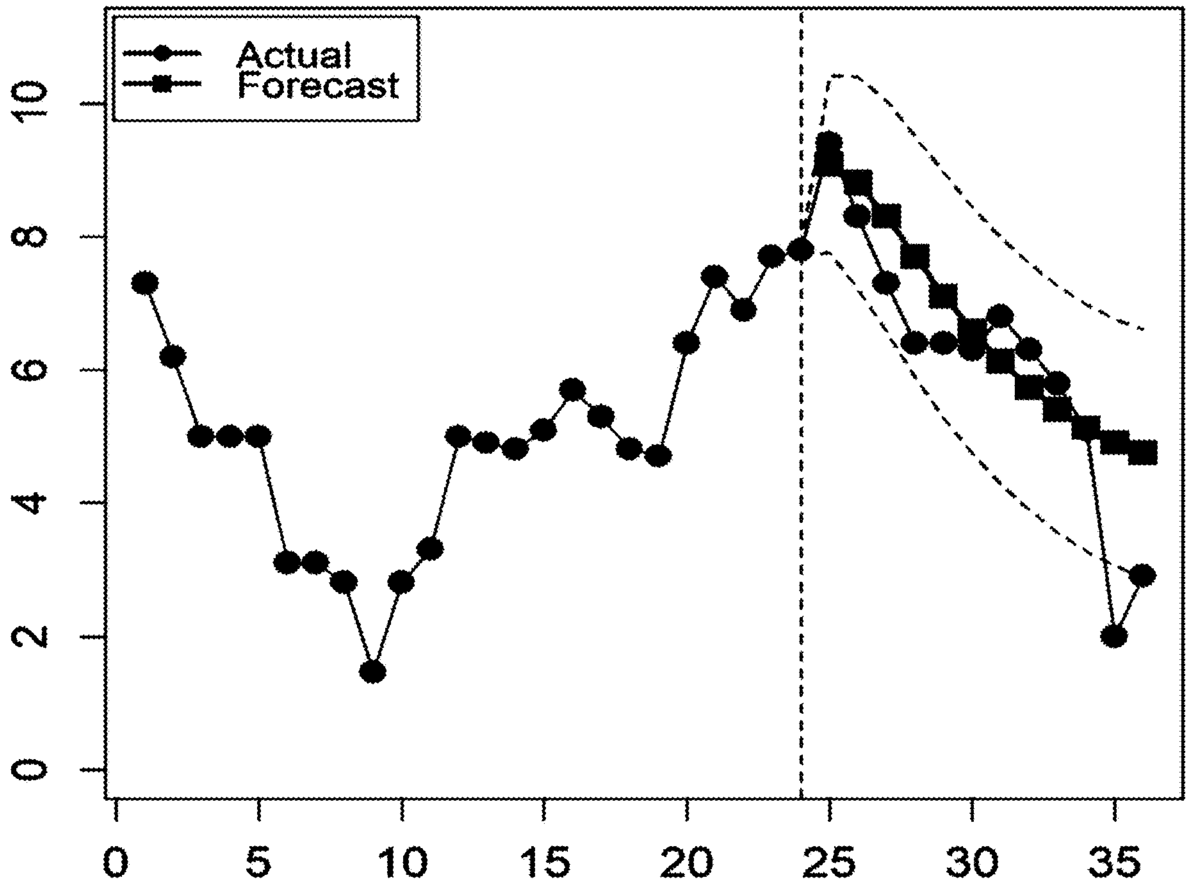
FIG. 2D is a time series plot that illustrates differences in time scale between measurements at a single location and a mesoscale forecast at a nearby grid point, according to an embodiment.

FIG. 2D is a time series plot that illustrates differences in time scale between measurements at a single location and a mesoscale forecast at a closest grid point, according to an embodiment. The horizontal axis indicates time in hours from a starting time and the vertical axis indicates wind speed in m/s. The forecast begins at 24 hours after the starting time and is represented by the solid squares. The actual measurements over the same interval after the starting time show the near future times were not well modeled by the 24 hour forecast. Although the NWP forecasts are useful, the actual observations often deviate substantially, as seen by the lower observations at 35 hours. This plot is discussed in more detail with reference to slide 7 in Appendix A.

Figure 2E:
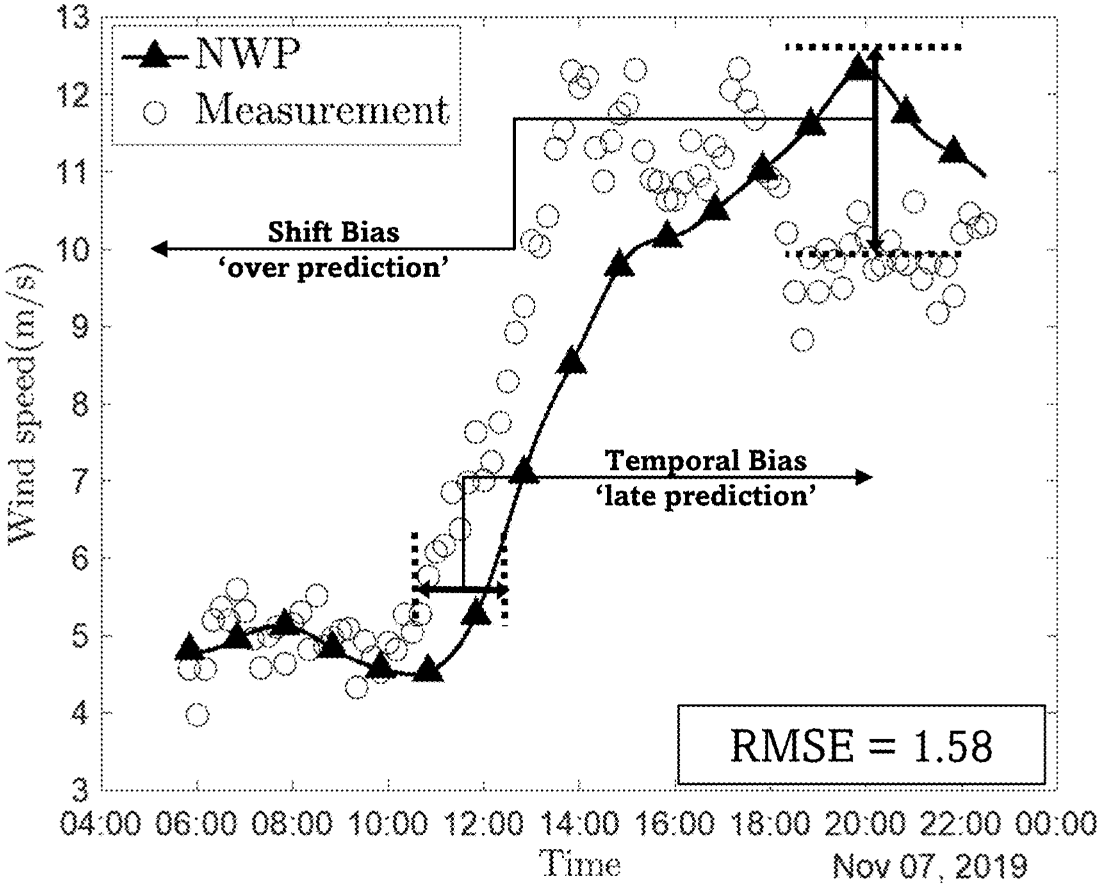
FIG. 2E and FIG. 2F are plots that illustrate differences between predicted and actual wind speeds at a location, which differences are attributed to temporal bias and shift bias, according to an embodiment.
Figure 2F:
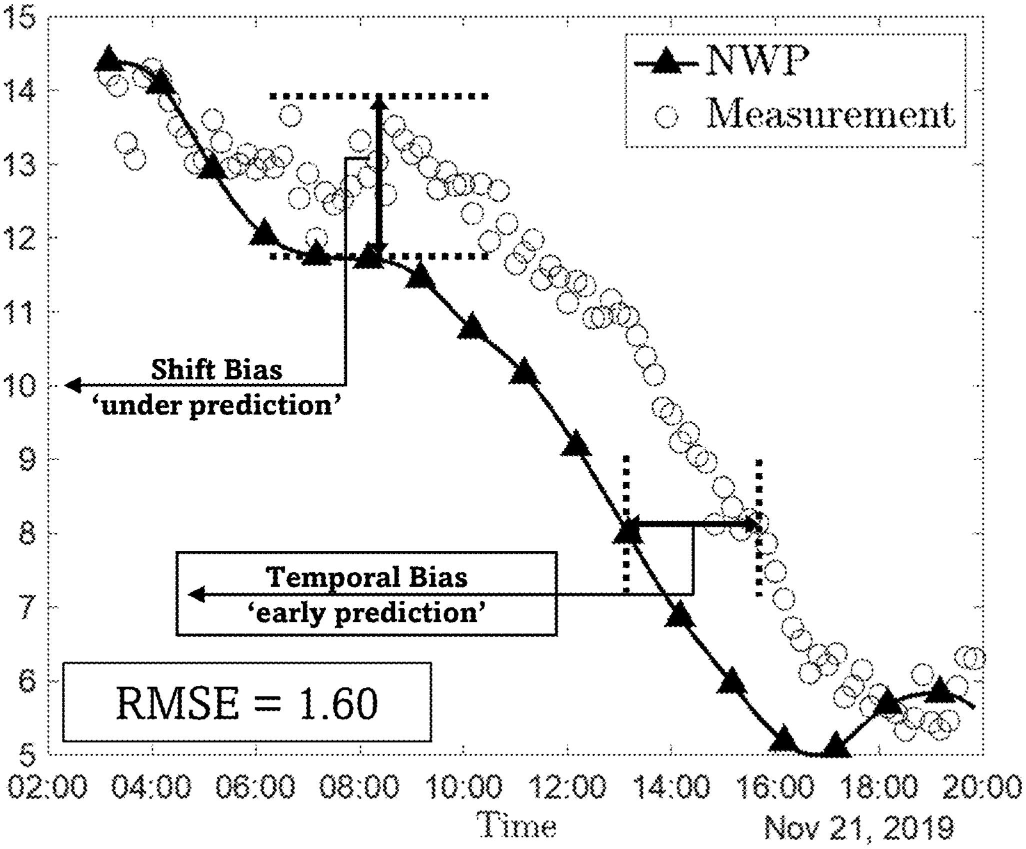

FIG. 2E and FIG. 2F are plots that illustrate differences between predicted and actual wind speeds at a location, which differences are attributed to temporal bias and shift bias at that location, according to an embodiment. The horizontal axis indicate time in hours after a starting time; and the vertical axis indicates wind speed in m/s. The solid triangles indicate the NWP winds when forecasted at the starting time. The open circle indicates the actual measured winds. The differences can be attributed to a shift bias when the NWP consistently over- or under-predicts the actual measurements over several times, and also can be attributed to a temporal bias when both traces are changing at a similar rate but with a noticeable time delay. Additive bias refers to the systematic NWP inaccuracies that can be corrected by scaling (a multiplicative coefficient on either time or wind). Examples are shift biases (over- or under-prediction), temporal biases (early/late prediction), and spatial biases (location-dependent errors). Multiplicative bias, on the other hand, refers to nonlinear biases that are related to the combined product of time and speed, and are not corrected by simple scaling operations. A prominent example are regime-specific NWP errors (e.g., errors that are more pronounced at higher or lower wind speed regimes). A root means square error (RMSE) between the two is 1.58 m/s in FIG. 2E and 1.6 m/s in FIG. 2F. These plots are discussed in more detail with reference to FIG. 1 in Appendix B.

Given the discrepancies between nearest or interpolated winds from mesoscale NWP and the actual winds eventually encountered on the fine scale of individual wind turbines, a method is developed here to reduce this discrepancy with physic-informed statistical models amendable to machine learning. By being physic-informed, the results are consistent with the known driving forces and such principles as conservation of mass, even on scales finer than the mesoscale NWP. By using a form amenable to machine learning, the parameter and coefficients of the physic-informed model can be updated automatically as more recent information about those discrepancies becomes available. This provides for a so-called evolving physic-informed ML statistical model.

Figure 3A:
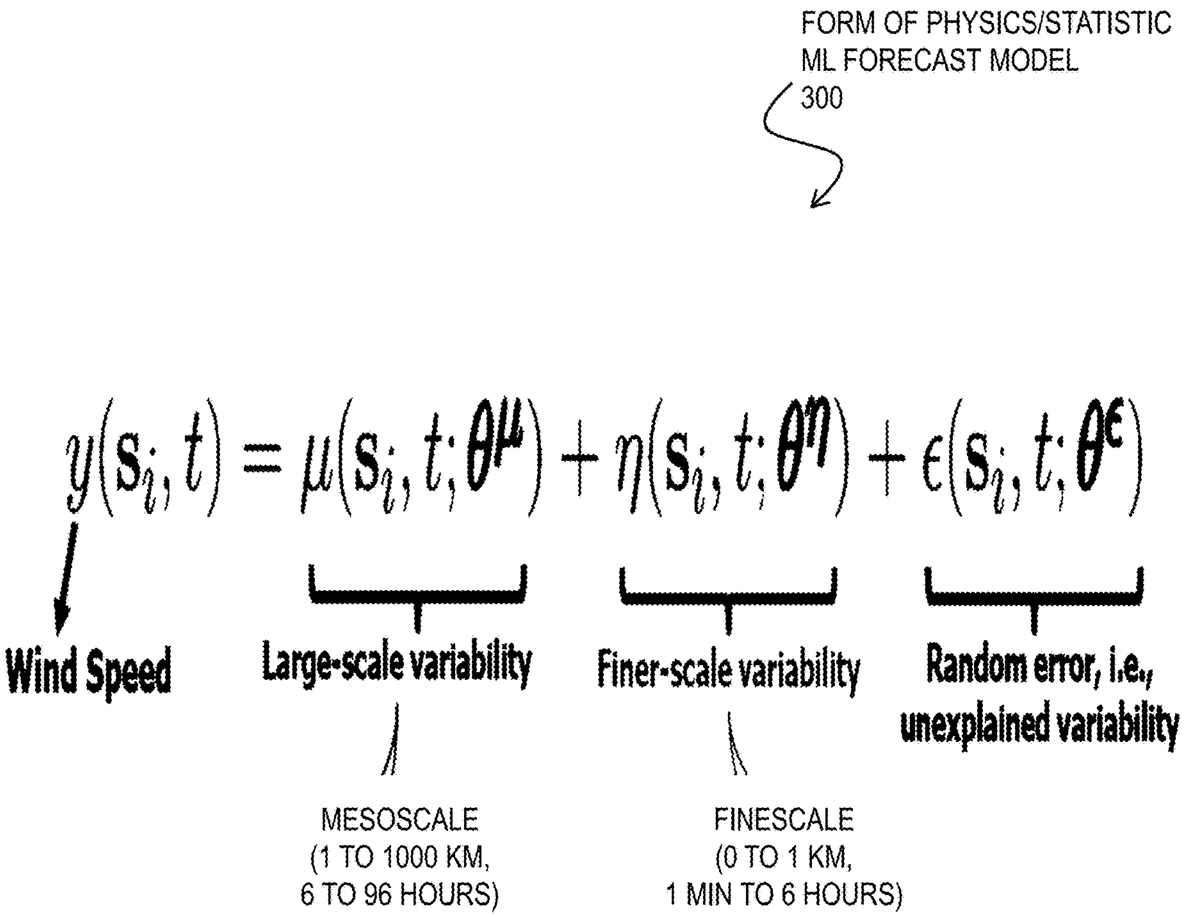
FIG. 3A is a block diagram depicting components of a physics-informed machine learning (ML) statistical model, according to an embodiment.

FIG. 3A is a block diagram depicting components of a physics-informed machine learning (ML) statistical model, according to an embodiment. This equation is repeated here as Equation 1.

$$Y(si, t) = \mu(si, t, \theta\mu) + \eta(si, t, \theta\eta + \epsilon(si, t, \theta\varepsilon) \quad (1)$$

Here, si represents discrete locations where wind is to be forecast, i=1 to N (e.g., the location of the N wind turbines), t represents some future time after the current time tc (during the model training mode, tc and t are both within the training time period TT and the "predicted" values at t based on observations before tc are compared to actual measurements at t), and Y represents the wind speed or direction or both. Here, μ(si, t, θμ) and η(si, t, θn) are two independent spatio-temporal functions, serving two distinct purposes, while ϵ(si, t, θϵ) is the Gaussian white noise process. Here θμ represents parameters that physically or statistically affect the value of μ; θη represents parameters that physically or statistically affect the value of η; and θϵ represents parameters that physically or statistically affect the value of ϵ. More specifically, μ(si, t, θμ) is intended to capture large-scale, low-frequency variations in the wind field that manifest themselves over relatively coarse time scales and spatial resolutions. For example, μ(si, t, θμ) describes the mesoscale assumed to be from about 1 km to about 1000 km, over time scales from about 6 hours to about 100 hours. In contrast, η(si, t, θη) characterizes the higher-resolution, site-specific variations that μ(si, t, θμ) fails to capture. For example, η(si, t, θη) describes the turbine scale, e.g., a fine scale assumed to be from about 10 m to about 1 km, over time scales from about 1 minute to about 6 hours.

Figure 3B:
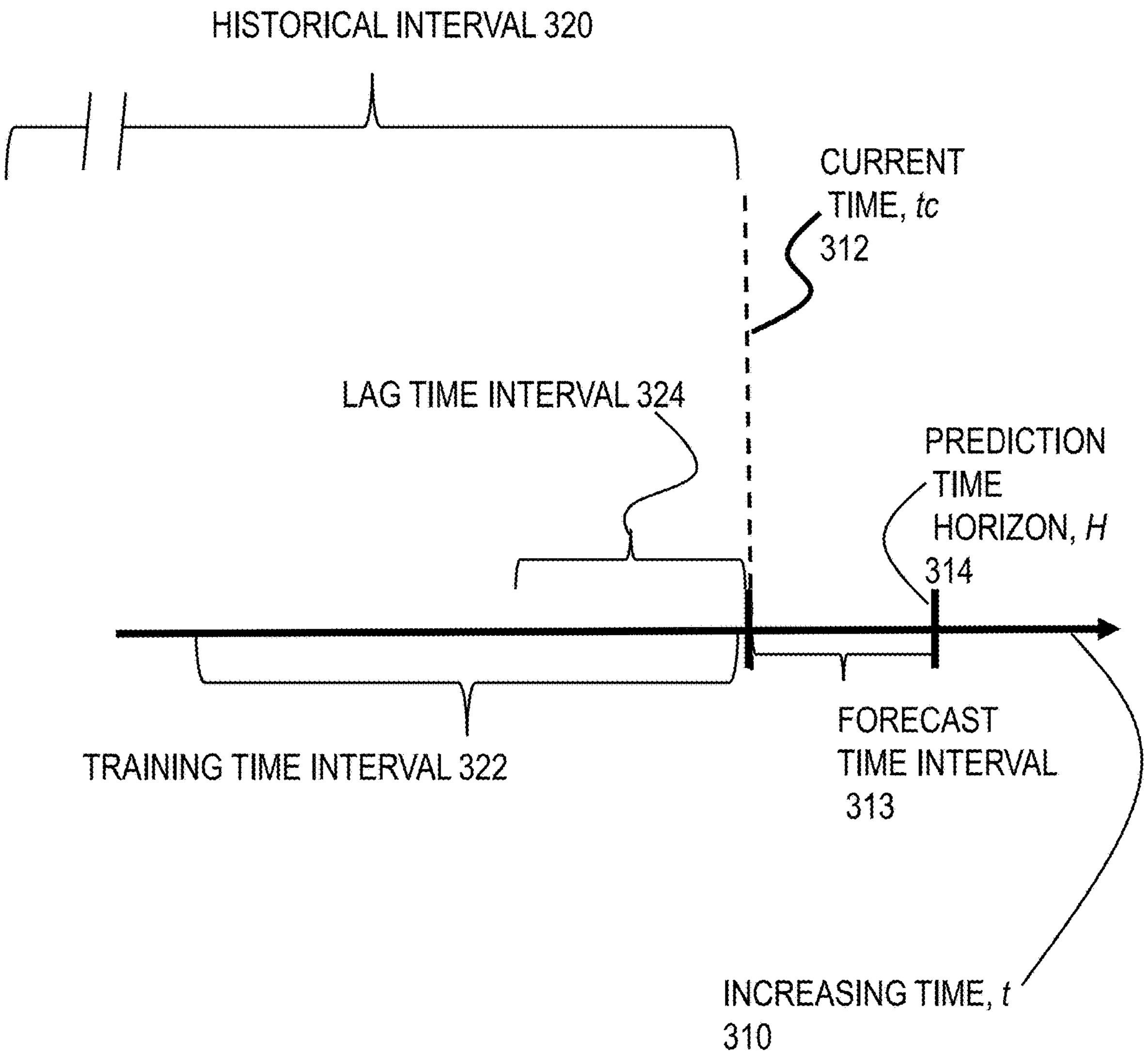
FIG. 3B is a block diagram depicting various times and time intervals used for a physics-informed evolving ML statistical model, according to an embodiment.

FIG. 3B is a block diagram depicting various times and time intervals used for a physics-informed evolving ML statistical model, according to an embodiment. The horizontal axis indicates time relative to a current time tc 312. At times before tc, there are measurements of actual winds at one or more locations of interest, si for i=1 to N at N locations of interest (e.g., at one or more ocean buoys or offshore wind turbines). Forecast winds are desired for one or more times out to a maximum prediction time horizon H 314, e.g., for one or more times t in forecast time interval 313. This forecast is based on the evolving physics-informed ML statistical model that uses measurements of wind and other correlated parameters and previous NWP forecasts in a lag time interval 324 ending at the current time tc 312. That model is not one that was trained a long time previously and kept static. Instead, that model was trained by using machine learning (ML) to automatically adjust parameters and coefficients based on the most recent comparisons of predictions and actual wind measurements in a training time interval 322 that ends with the most recent wind observations at time tc. Since the training time interval 322 slides with the current time, the model evolves over the entire history of its use, indicated by the historical time interval 320. In some embodiments, some parameters of the model are optionally updated based on one or more properties collected over the entire historical time interval 320.

Returning to Equation 1, the role of μ is to characterize the larger scale fluctuations in the local wind field, which are typically driven by physical phenomena that take place over relatively longer time scales (hours to days) and coarser spatial resolutions (mesoscale of 1 to several hundreds of km). Those large-scale fluctuations may include trends, diurnal and semidiurnal cycles, weather regime alternations, etc. Given their relatively coarse resolution, it is here assumed that mesoscale NWPs can play an essential role in capturing such larger scale fluctuations by virtue of their embedded physics. Thus, the θμ is based on one or more outputs of a mesoscale NWP. As such, μ is effectively a time-location offset calibration, given observed wind data, of the NWP wind forecast, $\hat{Y}$(sg, tg) at one or more grid locations indicated by the symbol sg at set forecast times indicated by symbol tg, This offset calibration, however, is a physically motivated calibration relying on physically reasonable parameters. An NWP model outputs not just wind but several other properties represented by the vector $\hat{X}$(sg, tg) as listed in Table 1 for the Rutgers University (RU) WRF model. Any or all of these can be used to correct the mesoscale discrepancies between model forecast winds and actual observed winds.

TABLE 1

List of RU-WRF NWP output variables.

| NWP variable | Description | Unit |
|---|---|---|
| WIND SPEED | Wind speed forecast at 100-m altitude | m/s |
| SWDOWN | Surface downwelling shortwave Flux | W/m$^2$ |
| LWUPB | Surface upwelling longwave flux | W/m$^2$ |
| GLW | Surface downwelling longwave flux | W/m$^2$ |
| SNOWNC | Accumulated total grid scale snow and ice | mm |

TABLE 1-continued

List of RU-WRF NWP output variables.

| NWP variable | Description | Unit |
|---|---|---|
| TEMPERATURE | Sea surface temperature | K |
| DIFFUSE_FRAC | Diffuse fraction of surface shortwave irradiance | — |
| LANDMASK | Land mask (1 For Land, 0 For Water) | — |
| LAKEMASK | Lake mask (1 For Lake, 0 For Non-Lake) | — |
| PBLH | Height of the top of the planetary boundary layer (PBL) | m |
| HUMIDITY | Relative humidity | % |
| PRESSURE | Sea level pressure | hPa |
| MDBZ | Maximum radar reflectivity | dBZ |
| U | Eastward wind component | m/s |
| V | Northward wind component | m/s |
| WINDGUST | Wind gust, computed by mixing down momentum from the level at the top of the planetary boundary layer | m/s |

In a first step, the hourly NWP output is interpolated in time to the fine-scale temporal resolution, such as 1-min or 10-min resolution at which the forecasts are to be made, yielding the time interpolated variables $\tilde{Y}(sg, t)$ and $\tilde{X}(sg, t)$, corresponding to wind and other output variables (such as listed in Table 1), respectively. Any temporal interpolation may be used. In the example embodiment described in Appendix B, cubic splines are used. Let $G(sg, tg)=[G1(sg, tg), \ldots, Gm(sg, tg)]^T$ be the (transposed vector indicated by superscript T) set of m spatio-temporal explanatory variables, which are to be included as regressors or predictors in modeling $\mu(si, t)$. For example, G(sg, tg) may include a "most informative" subset of $\hat{X}(sg, tg)$, in addition to other exogenous variables or functions that possess some degree of explanatory power in correcting the NWP biases. The set $\tilde{G}(sg, t)$ denotes the time interpolated version of G(sg, tg). As long as an objective method is outlined for selecting the G(sg, tg), that selection can be done automatically by machine learning during training time interval 322. Thus, in some embodiments, an objective method for selecting the membership in G(sg, tg) is provided as described below and in more detail in Appendix B. In other embodiments, other objective means are used. In some embodiments, the membership in G(sg, tg) is predetermined and not varied based on ML within the training time interval 322.

Furthermore, in some embodiments, multiple wind speed forecasts preceding the forecast time t in forecast interval 312 by different lags times are used. Let $\Delta tg$ indicate the time difference between successive forecast lags, and let l=1 to L indicate a lag number up to a maximum number of lags, L. Then the lth lag is given by $l\,\Delta tg$, and $\tilde{Y}^L(sg, t)=[\tilde{Y}(sg, t), \tilde{Y}(sg, t-\Delta tg), \ldots, \tilde{Y}(sg, t-L\Delta tg)]$ denotes a vector of (interpolated) lagged NWP forecasts of wind speed, up to maximum lag number L. $L\Delta tg$ is equal to the length of the lag time interval 324. Note that the lag time interval actually changes with which time (1) one is standing at. If t=tc+1 for example, then it is exactly what is depicted in FIG. 3B. However, if t=tc+2, then the lag interval also shifts by one. So, in essence, as written mathematically here, the lag time interval is from t all the way back to $t-L\Delta tg$. The inclusion of $\tilde{Y}^L(sg, t)$ is motivated by the potential role of multiple time lags in correcting the temporal biases of NWPs.

In light of these considerations, $\mu(s, t)$ takes the form of Equation 2.

$$\mu(si, t) = a^T \tilde{Y}^L(sg, t) + b^T \tilde{G}(sg, t) + \{c^T \tilde{G}(sg, t)\} \tilde{Y}(sg, t) \tag{2}$$

Using this form, the selection of the m parameters in $\tilde{G}(sg, t)$ or the values in the vectors of coefficients a, b and c, or some combination, is determined automatically with ML by fitting Equation 2 to the wind measurements during the training time interval 322.

In the embodiment described in more detail in Appendix B, the selection of the parameters in $\tilde{G}(sg, t)$ is performed generally as follows. The parameters of $\tilde{G}$ are selected from a candidate set comprising multiple lag time values of six NWP outputs: air pressure, surface temperature, wind gust, relative humidity, eastward and northward wind components. Those variables are physically known to contribute, either directly or indirectly, to local wind field formation and propagation. From a purely statistical perspective, those six variables also typically exhibit non-negligible correlations with the actual wind speed measurements. In addition to the abovementioned six direct outputs from the NWP, two other parameters derivable from those six at multiple grid points (and heights in some embodiments) are also included as candidates: the spatio-temporal pressure differential and the geostrophic wind. Detail on the calculation of these two derived, also termed "engineered," candidate parameters are reserved for Appendix B.

The values of candidates are considered at the forecast time t and at several lagged times up to L lags before the forecast time t. Because the NWP forecasts are not updated every time increment at the higher resolution, a single NWP forecast is used for several different lagged times. For example, some NWP models are updated once or twice a day, and thus one forecast must be used for several time increments at corresponding several lag times. The inclusion of the lagged variables is again motivated by a desire to acquire the advantage of correcting potential temporal biases. But including various lags great increases the number of candidates. Suppose one only includes four-hourly lags for each of the eight parameters listed above. This corresponds to 24 lags in 10-min resolution (4 hours×6 ten-minute intervals per hour). Hence, one ends up with 8 variables×24 lags=192 regressors to be included in $\tilde{G}(sg, t)$. However, not all features are expected to be relevant at all times. In fact, more often than not, using an excessively large set of predictors does not coincide with the best predictive performance. Including a variable in the set at one instance does not necessarily justify its inclusion in future time instances. Thus a simple objective rule is imposed to select a parameter for membership in G(sg, tg): only the most correlated lagged version of the same variable is included in G(sg, tg). Further, a parameter is not included in G(sg, tg) at all if no lag for that parameter shows a correlation above a threshold correlation. These are objective rules that can be implemented automatically by machine learning during the training time interval 322.

For effective machine learning, it is advantageous for the computations for correlation to be used to determine membership in G(sg, tg) are done efficiently. So, in some embodiments, simple measures of explanatory power, namely partial autocorrelation functions (PACFs) are used to determine the maximum time lag L for $\tilde{Y}^L(sg, t)$; and Pearson's correlation is used to select the subset of exogenous predictors G(sg, tg).

Returning to Equation 1, the role of $\eta$ is to characterize the higher-frequency variations (site-specific, minutes to hours) which are typically driven by sub-meso-scale physical phenomena that meso-scale NWPs fail to capture. In the embodiment of Appendix B, $\eta$ is modeled as a spatio-temporal Gaussian Process (GP), which is a well-suited machine learning model for spatio-temporal data. This model is used to fit the residuals in the wind left after applying μ using Equation 2 above. As described in more detail in Appendix B, Let z=[z(s1, t1), z(s1, t2), . . . , z(s1, tc), . . . , z(sN, tc)]$^T$ be the vector of spatio-temporal residuals where N is the number of prediction locations and the is the end of the training time interval (TT), such that z(si, t)=Y(sg, t)−μ. The vector z is regarded as a realization of a spatiotemporal Gaussian process, Z(•)~GP(M(s, t),K(u, w)), such that M(s, t), and K(u, w) are the GP mean and (stationary) covariance functions, respectively. The latter takes as input the spatial lag $\mu \in R^2$ and the temporal lag $w \in Z+$.

The most prevalent approach to specify K(u, w) in the spatio-temporal modeling literature is through the so-called separable approach, which decomposes the dependence structure over space and time such that K(u, w)=Ks(u)×Kt(w), wherein Ks(u) and Kt(w) are two independent parametric covariance structures for space and time, respectively. Despite its simplicity and computational benefits, the disconnect between space and time in the separable approach yields model specifications that violate the physical property of wind advection, i.e., the propagation of wind along a certain prevailing direction, as explained in more detail in Appendix B. Instead, here a class of covariance models known in the geostatistical literature as the Lagrangian reference framework is adopted, which is capable of mimicking the "advection" of spatio-temporal information by having the parametric form given in Equation 3.

$$K(u, w) = E\{\psi(u - Vw)\} \tag{3}$$

Where V is the advection velocity vector, E indicates expected value, and ψ(•) is a positive-definite covariance function. As explained in more detail in Appendix B, V is a function of the mean velocity Λv and the velocity variance Σv. Further derivations based on these novel approaches are explained in Appendix B and introduce, besides the coefficients Λv and Σv, further coefficients to be determined by machine learning, including marginal variance α, asymmetry parameter λ of the covariance function, the GP mean M(s, t) represented by the symbol β0; the range parameters denoted by rs and rt for space and time, respectively; and the noise variance, δ.

The coefficients and parameters are estimated during the training time interval 322 in a two stage fashion: In the first stage, after selecting the highly correlated parameters and lags and estimating Λv and Σv using training NWP data, then a, b, and c are estimated, e.g., using ordinary least squares. In the second stage, the residuals are then used to estimate the remainder of the coefficients, e.g., using maximum likelihood estimation Putting all of the above pieces together, the joint predictive distribution of the final set of spatio-temporal forecasts can be fully characterized. With all these parameters and coefficients recently learned during training time interval 322, a forecast f is performed for the forecast time interval 313 as given by Equation 4.

$$\hat{f} = \left[\hat{f}(s_1, t_c + 1), \ldots\ \hat{f}(s_N, t_c + H)\right]^T \sim N(\hat{\boldsymbol{\mu}} + \hat{\boldsymbol{\eta}}, \widehat{K_\eta}) \tag{4}$$

Where μ=[($\hat{\mu}$($s_1$, $t_c$+11), . . . , $\hat{\mu}$($s_N$, $t_c$+H)] denotes the N·H×1 vector of evaluations of μ(s, t) at N target locations and H look-ahead times. Similarly, $\hat{\eta}$ and $\widehat{K_\eta}$ are the evaluations of the GP predictive mean and covariance at the target locations and look-ahead times, respectively.

A specific embodiment, called the AI-powered Rutgers University Weather Research & Forecasting (AIRU-WRF) model is described in example embodiments, with reference to Appendix B.

Figure 4:
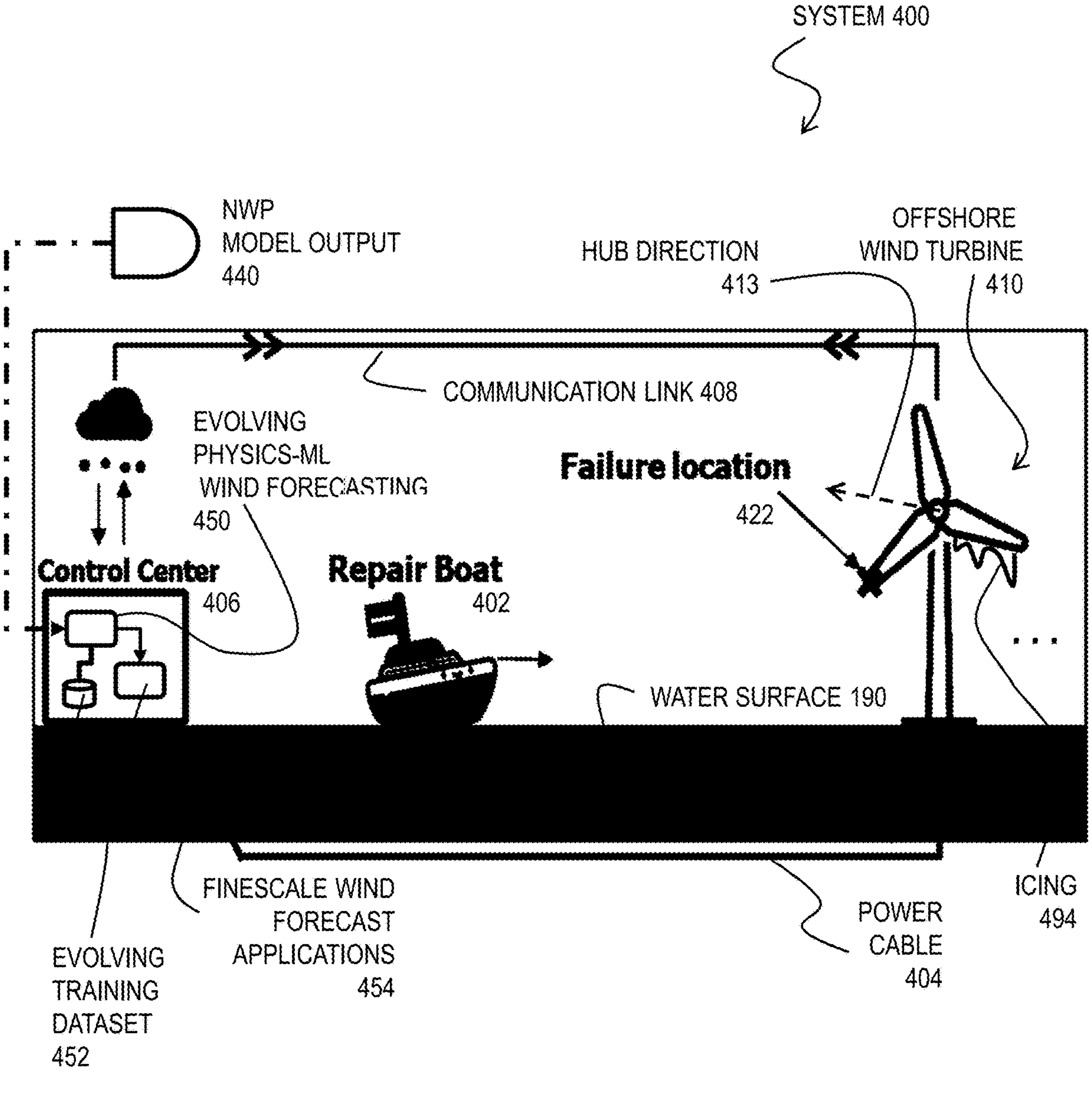
FIG. 4 is a block diagram that illustrates an example wind farm system using a physics-informed evolving ML statistical model to forecast wind at the sites of wind turbines, according to an embodiment.

FIG. 4 is a block diagram that illustrates an example wind farm system 400 using a physics-informed evolving ML statistical model 450 to forecast wind at the sites of wind turbines 410, according to an embodiment. Each turbine 410 in the system sends electrical power it has generated through a power cable 404 that is monitored by a control center 406 conveniently located for sending power to users or storage, such as on shoreside land. Each turbine 410 in the system performs one way or two way communication with the control center 406 through one or more wired or wireless communications links 408. Sensor data and other information's such as hub direction 413 is sent from the offshore wind turbine 410 to the control center 406 through communication link 408. The control center includes an evolving physics-informed ML statistical wind forecasting model 450 as described above, a means for receiving NWP model output 440, an evolving training dataset 452 to store the data received from the NWP model output 440 and turbine 410, as described above, and a fine-scale wind forecast applications module 454 configured to operate various components of the system 400 based on the fine-scale wind forecast provided by model 450. The system includes a mobile servicing platform, such as repair boat 402. The system does not include the water surface 190 depicted for context only.

For example, based on the fine scale wind forecast, the applications 454 determine or cause hub direction to be changed as efficient, power produced by each wind turbine 410 to be predicted, delivery of that power to be efficiently planned, subpar power output to be detected, or attributed to a point of failure 422 or to icing 494, and windows of safe operation for the repair boat are identified for performing scheduled or on-demand repairs.

Although processes, equipment, and data structures are depicted above as integral blocks in a particular arrangement for purposes of illustration, in other embodiments one or more processes or data structures, or portions thereof, are arranged in a different manner, on the same or different hosts, in one or more databases, or are omitted, or one or more different processes or data structures are included on the same or different hosts.

Figure 5:
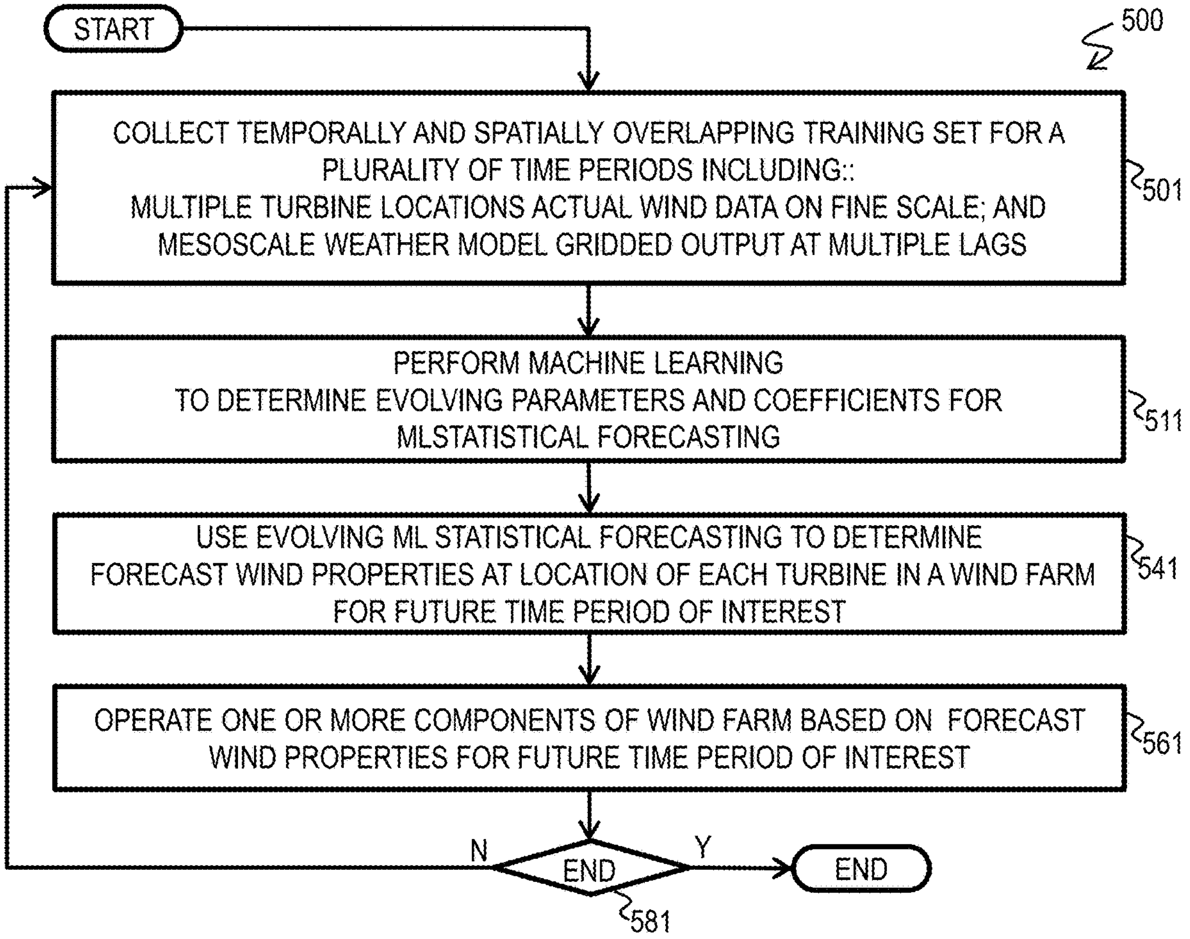
FIG. 5 is a flow diagram that illustrates an example method for operating a wind turbine farm based on winds forecast by a physics-informed evolving ML statistical model, according to an embodiment.

FIG. 5 is a flow diagram that illustrates an example method 500 for operating a wind turbine farm based on winds forecast by a physics-informed evolving ML statistical model, according to an embodiment. Although steps are depicted in FIG. 5, and in subsequent flowcharts in FIG. 6 and FIG. 7, as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

In step 501, training data is collected for calibrating a temporally evolving physics-informed ML statistical model. The training data includes, for a multiple time periods, temporally and spatially overlapping data including actual wind data on fine scale at multiple turbine locations, and mesoscale weather model gridded output at multiple lags. Each time period is sufficient for testing forecasts to a time horizon H with sufficient inputs at one or more lags before the forecast period. The plurality of time periods composes the training time interval 322.

In step 511, machine learning is performed to determine selected parameters, a subset of all mesoscale model outputs and properties derived therefrom, at each of multiple lags. and to evaluate coefficients used in the statistical model, including coefficients for the selected parameters, coefficients for one or more wind outputs from eh mesoscale model, and one or more physics-informed parameters, such as advection mean and variance.

In step 541, the physics-informed ML statistical model is run using the parameters and coefficient values learned during step 511 and current time and lagged inputs within a lag time interval 324, to forecast winds on the fine-scale at each of one or more turbine locations in a turbine wind farm.

In step 551, one or more components of the wind turbine farm is operated based on the forecast find scale wind at one or more wind turbine locations. For example, the hub direction of one or more wind turbines is changed, or the power output is predicted for determining delivery or delivery prices to users, or deviations from predicted power delivery is ascribed to a point of failure on a turbine or to icing on the turbine, or a repair boat or other mobile serving platform is dispatched to the location of one or more wind turbines if it is determined that wind conditions are below a threshold for safe seakeeping or repair or maintenance operations.

In step 561 it is determined whether conditions for ending operations are satisfied, e.g., to shut down for control center maintenance or repair or staff holiday or reaching some other condition that recommends ceasing operations. If so, the process ends. Otherwise, control passes back to step 501 to collect the next data for the sliding training time interval.

Figure 6:
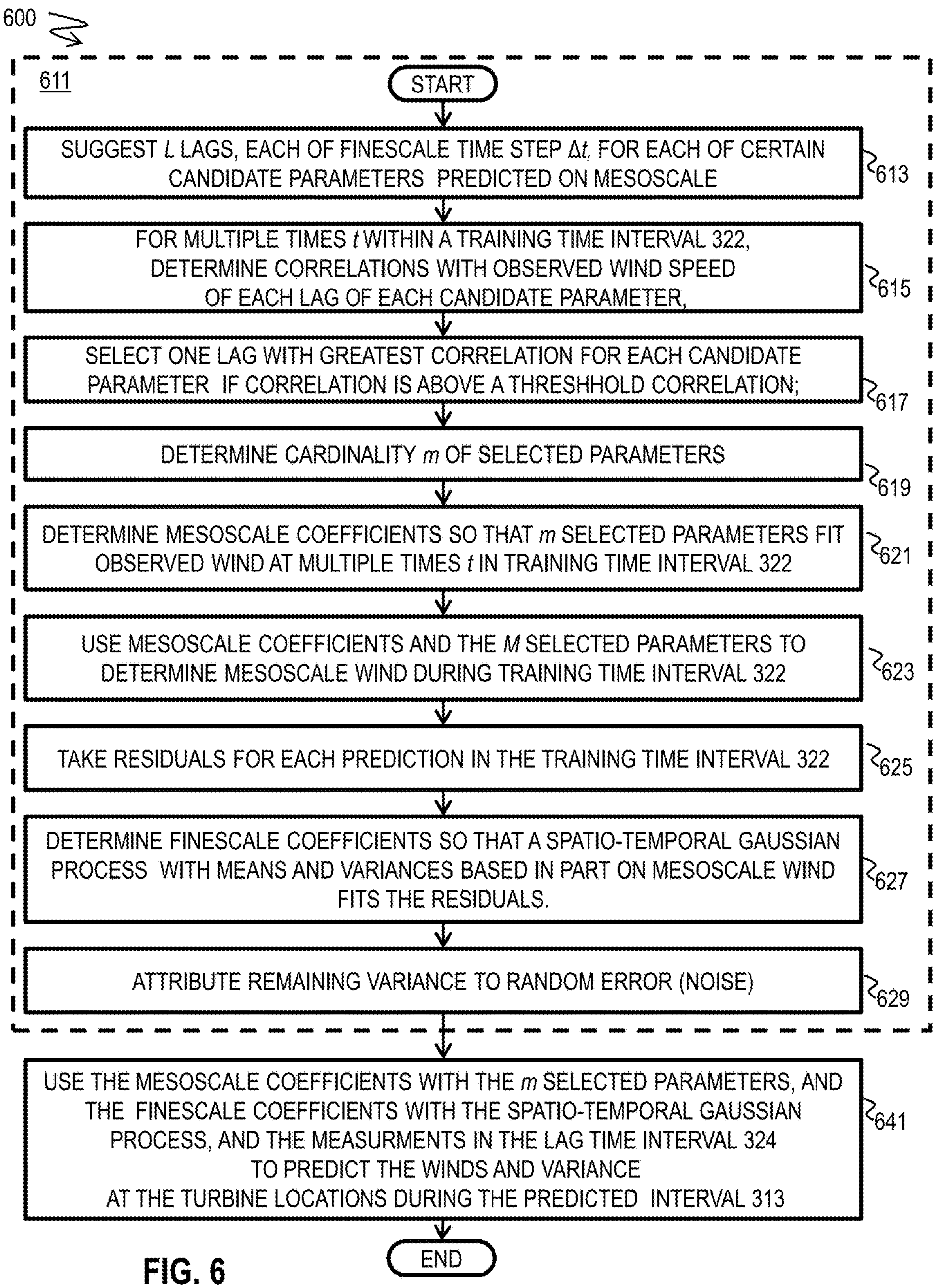
FIG. 6 is a flow diagram that illustrates an example method for performing two steps of the method of FIG. 5, according to an embodiment.

FIG. 6 is a flow diagram that illustrates an example method 600 for performing two steps of the method of FIG. 5, according to an embodiment. The method 600 includes step 611 that is one embodiment of the step 511 depicted in FIG. 5. The method 600 also includes step 641 that is one embodiment of the step 541 depicted in FIG. 5.

Step 611 includes steps 613 through step 629. In step 613, L lags, each of fine scale time step $\Delta t$, for each of certain candidate parameters predicted on mesoscale are suggested as physically relevant for the mesoscale contribution to the local wind. In some embodiments, this step is predetermined and not repeated on each iteration of step 611.

In step 615, for multiple times t within a training time interval 322, determine correlations with observed wind speed of each lag of each candidate parameter. For example, an efficient form for determining such correlation is used to speed machine learning. In step 617, one lag with greatest correlation is selected for each candidate parameter, if correlation is above a threshold correlation, such as a threshold of 0.4. In step 619, the cardinality m of selected parameters is determined. For example, of 24 lags for each of 8 candidate=196 parameter lags, the cardinality m is less than or equal to 8, the number of candidate mesoscale outputs or derived variable. These steps 615 through 619 amount to automated determination of a subset of selected parameters determined by machine learning operating on the dataset of the training time interval 322.

In step 621, mesoscale coefficients are determined so that m selected parameters fit observed wind at multiple times t in training time interval 322. For example, coefficients a, b and c of Equation 2 are determined to fit the measured fine scale wind speeds during the training time interval 322. Thus, the mesoscale portion $\mu$ of the evolving physics-informed ML statistical model is determined.

In steps 623 and 625 the residuals to be fit with a fine-scale portion $\eta$ of the model are determined. In step 623, mesoscale coefficients and the m selected parameters are used to determine mesoscale winds during training time interval 322. In some embodiments, step 623 includes determining advection velocity V mean and variance, $\Lambda v$ and $\Sigma v$, respectively, for the fine scale model $\eta$. In step 625, the mesoscale portion $\mu$ of the model is subtracted from the actual measured winds in the same interval to get residuals z for each prediction in the training time interval 322.

In step 627, the rest of the fine scale coefficients are determined so that a spatio-temporal Gaussian process with means and covariances based in part on mesoscale wind fits the residuals. For example, the coefficients determined by machine learning during training time interval 322, include marginal variance $\alpha$, asymmetry parameter $\lambda$ of the covariance function, the GP mean M(s, t) represented by the symbol $\delta 0$; the range parameters denoted by rs and rt for space and time, respectively.

In step 629, the remaining variance is attributed to random error (noise). For example, the noise variance, $\delta$ is determined.

Now that the model has been learned based on the data for the training time interval 322, it can be used to forecast winds. In step 625, the mesoscale coefficients with the m selected parameters, and the fine scale coefficients with the spatio-temporal Gaussian process, and the measurements in the lag time interval 324 are used to predict the winds and variance at the turbine locations during the forecast time interval 313

FIG. 7 is a flow diagram that illustrates an example method 700 for performing another step of the method of FIG. 5, according to an embodiment. The method 700 is one embodiment of the step 561 depicted in FIG. 5. More details on the embodiments of method 700 are described in Appendix A.

In step 731 it is determined whether the predicted direction, of the fine scale wind at a wind turbine location, changes greater than a threshold for a time period of interest. This process is described in more detail in Appendix A slides 18 to 20. For example, it is determined whether the average predicted wind direction is at a different angle more than 7 degrees from the current angle of the yaw (the horizontal component of the hub direction 113). If not, control passes to step 741 described below. If so, control first passes to step 733. In step 733 the horizontal direction of the wind turbine is redirected to face the new wind direction. For example, a message is sent from applications 454 over communication link 408 to controller 117 that causes the controller 117 to activate the direction motors 115 to change the yaw of the hub direction 113 of the hub 112.

In step 741, it is determined whether the forecast wind speed is lower than a safe threshold for service for a turbine due for maintenance or otherwise requiring service or during an installation phase of the wind farms. Many non-urgent operations can be "optimally" scheduled based on these forecasts. This situation is described in more detail in Appendix A slides 24 through 26. If not, control passes to step 745, described below. Otherwise control first passes to step 743. In step 743, the mobile servicing platform 102, such as repair boat 402, is sent to travel to and maintain or repair a wind turbine 110 in the wind turbine farm system 100. For example, a message is sent from applications 454 over communication link 408 to the repair boat 402 to repair the fault location 422 on turbine 410.

In step 745, the forecast electric power output of each turbine and the forecast net electric power output of the turbine farm is determined based on the forecast wind speed and direction at each turbine 110. For example, the power equation listed in slide 12 of Appendix A is used. Control then passes to step 751.

In step 751, it is determined whether a fault is detected because actual power delivered from one or more wind turbines 110 is less than forecast, based on forecast wind speed, by more than some threshold of significance, e.g., outside the expected error in the forecast wind speeds. If not, control passes to step 753 to prepare for delivery of the expected power. For example, arrangements are made to move the power to the users, e.g., to the applicable municipal power grid at an appropriated time or price. The process then ends and returns control to step 581 in FIG. 5.

If it is determined in step 751 that a fault is detected due to power delivered significantly less than forecast, then control passes to step 757. In step 757 it is determined whether the fault is likely due to ice given power reduction, air temperature and humidity, as described in more detail in Appendix A, slides 21 and 22. If not, control passes to step 755 remediate or correct power delivery for the fault detected. Control then passes to step 753, described above. If ice is detected, then control passes to step 759 to remediate or correct power delivery for the ice detected. Control then passes to step 753, described above.

2. Example Embodiments

Example embodiments are described in more detail in Appendix A and Appendix B. Statements made in each Appendices apply only to the embodiment in the Appendix in which the statement appears. Each Appendix shows test data or simulations that demonstrate good performance compared to other modeling schemes in effect.

3. Computational Hardware Overview

Figure 8:
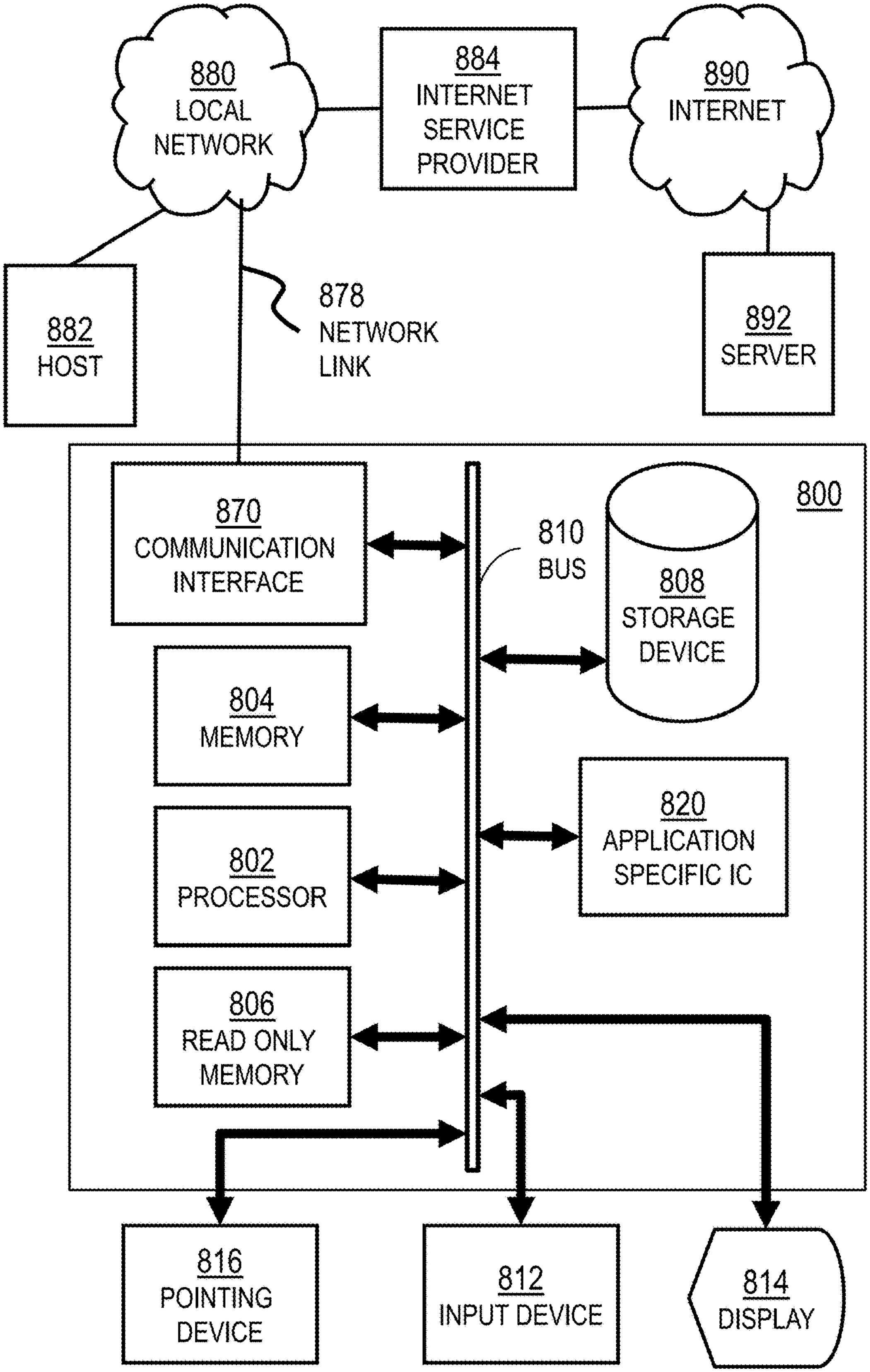
FIG. 8 is a block diagram that illustrates a computer system upon which an embodiment of the invention may be implemented.

FIG. 8 is a block diagram that illustrates a computer system 800 upon which an embodiment of the invention may be implemented. Computer system 800 includes a communication mechanism such as a bus 810 for passing information between other internal and external components of the computer system 800. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of one or more methods described herein.

A sequence of binary digits constitutes digital data that is used to represent a number or code for a character. A bus 810 includes many parallel conductors of information so that information is transferred quickly among devices coupled to the bus 810. One or more processors 802 for processing information are coupled with the bus 810. A processor 802 performs a set of operations on information. The set of operations include bringing information in from the bus 810 and placing information on the bus 810. The set of operations also typically include comparing two or more units of information, shifting positions of units of information, and combining two or more units of information, such as by addition or multiplication. A sequence of operations to be executed by the processor 802 constitutes computer instructions.

Computer system 800 also includes a memory 804 coupled to bus 810. The memory 804, such as a random access memory (RAM) or other dynamic storage device, stores information including computer instructions. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of computer instructions. The computer system 800 also includes a read only memory (ROM) 806 or other static storage device coupled to the bus 810 for storing static information, including instructions, that is not changed by the computer system 800. Also coupled to bus 810 is a non-volatile (persistent) storage device 808, such as a magnetic disk or optical disk, for storing information, including instructions, that persists even when the computer system 800 is turned off or otherwise loses power.

Information, including instructions, is provided to the bus 810 for use by the processor from an external input device 812, such as a keyboard containing alphanumeric keys operated by a human user, or a sensor. A sensor detects conditions in its vicinity and transforms those detections into signals compatible with the signals used to represent information in computer system 800. Other external devices coupled to bus 810, used primarily for interacting with humans, include a display device 814, such as a cathode ray tube (CRT) or a liquid crystal display (LCD), for presenting images, and a pointing device 816, such as a mouse or a trackball or cursor direction keys, for controlling a position of a small cursor image presented on the display 814 and issuing commands associated with graphical elements presented on the display 814.

In the illustrated embodiment, special purpose hardware, such as an application specific integrated circuit (IC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 870 sends and receives electrical, acoustic or electromagnetic signals, including infrared and optical signals, that carry information streams, such as digital data.

The term computer-readable medium is used herein to refer to any medium that participates in providing information to processor 802, including instructions for execution. Such a medium may take many forms, including, but not limited to, non-volatile media, volatile media and transmission media. Non-volatile media include, for example, optical or magnetic disks, such as storage device 808. Volatile media include, for example, dynamic memory 804. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 802, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 802, except for carrier waves and other signals.

Logic encoded in one or more tangible media includes one or both of processor instructions on a computer-readable storage media and special purpose hardware, such as ASIC 820.

Network link 878 typically provides information communication through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890. A computer called a server 892 connected to the Internet provides a service in response to information received over the Internet. For example, server 892 provides information representing video data for presentation at display 814.

The invention is related to the use of computer system 800 for implementing the techniques described herein. According to one embodiment of the invention, those techniques are performed by computer system 800 in response to processor 802 executing one or more sequences of one or more instructions contained in memory 804. Such instructions, also called software and program code, may be read into memory 804 from another computer-readable medium such as storage device 808. Execution of the sequences of instructions contained in memory 804 causes processor 802 to perform the method steps described herein. In alternative embodiments, hardware, such as application specific integrated circuit 820, may be used in place of or in combination with software to implement the invention. Thus, embodiments of the invention are not limited to any specific combination of hardware and software.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server 892 transmits program code for a particular application, requested by a message sent from computer 800, through Internet 890, ISP equipment 884, local network 880 and communications interface 870. The received code may be executed by processor 802 as it is received, or may be stored in storage device 808 or other non-volatile storage for later execution, or both. In this manner, computer system 800 may obtain application program code in the form of a signal on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red a carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

4. Alternatives, Deviations and Modifications

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps.

Furthermore, the indefinite article "a" or "an" is meant to indicate one or more of the item, element or step modified by the article.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus, a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5× to 2×, for example, about 100 implies a value in a range from 50 to 200. Moreover, all ranges disclosed herein are to be understood to encompass any and all sub-ranges subsumed therein. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10. e.g., 1 to 4.

What is claimed is:

1. A method for operating a component of a wind turbine farm comprising a plurality of wind turbines, a control center, or a service platform, the method comprising:

setting a geographic area of interest that encompasses the plurality of wind turbines in the wind turbine farm to be operated;

setting a forecast time interval from a selectable current time to a forecast horizon time of interest;

setting a maximum lag time interval for using mesoscale weather forecasts to describe wind conditions up to the horizon time of interest, collecting mesoscale weather forecasts from a weather model for a machine learning (ML) training time interval TT at a plurality of model grid locations of interest that encompasses the geographic area of interest, wherein the duration of the ML training time interval TT is at least ten times the maximum lag time interval;

collecting fine-scale wind measurements at locations of two or more of the plurality of wind turbines during the ML training time interval TT;

determining selected parameters of the mesoscale weather forecasts and coefficients of an evolving ML forecast model based on the mesoscale weather forecasts and the fine-scale wind measurements during the ML training time interval TT ending at a current time;

using mesoscale weather forecast values for the selected parameters during a lag time interval up to the maximum lag time interval, and the coefficients of the evolving ML forecast model, to produce a forecast wind at each location of the plurality of wind turbines at a future time during the forecast time interval after the current time; and operating the component of the wind turbine farm based on the forecast wind at the location of at least one of the plurality of wind turbines.

2. The method as recited in claim 1, wherein the forecast time interval is selected in a range from 10 minutes to 24 hours.

3. The method as recited in claim 1, wherein the maximum lag time interval is selected in a range from 4 hours to 24 hours.

4. The method as recited in claim 1, wherein the fine-scale wind measurements have a period selected in a range from 1 minute to 30 minutes.

5. The method as recited in claim 4, wherein the fine-scale wind measurements have a period of about 10 minutes.

6. The method as recited in claim 1, wherein the selected parameters of the mesoscale weather forecasts are selected from candidates that include direct output parameters air pressure, surface temperature, wind gust, relative humidity, eastward wind component, and northward wind components and also include derived parameters pressure differential and geostrophic wind.

7. The method as recited in claim 6, wherein the selected parameters of the mesoscale weather forecasts are selected from one lag time for each of the candidates, wherein the one lag time is selected in a range from 1 to 10 times a temporal resolution of the fine-scale wind measurements.

8. The method as recited in claim 7, wherein the one lag time for each of the candidates, is the one lag time most correlated with the wind speed measurement at the end of the lag time interval.

9. The method as recited in claim 8, wherein the candidate is not selected if the one lag time most correlated with the wind speed measurement at the end of the lag time interval has a correlation measure less than 0.4.

10. The method as recited in claim 1, wherein the coefficients of the evolving ML forecast model include coefficients of a spatio-temporal Gaussian process for residuals of a measured wind after the effects of a mesoscale wind and selected parameters are subtracted.

11. The method as recited in claim 10, wherein the coefficients of the spatio-temporal Gaussian process includes a mean term and variance term based at least in part on the mesoscale wind.

12. The method as recited in claim 1, wherein said operating the component of the wind turbine farm further comprises changing an orientation of a wind turbine rotor to an average forecast wind direction, if the average forecast wind direction differs by more than a threshold from a current orientation of the wind turbine rotor.

13. The method as recited in claim 12, wherein the threshold is 7 degrees.

14. The method as recited in claim 1, wherein said operating the component of the wind turbine farm further comprises detecting a fault in a wind turbine when power delivered by the wind turbine is less than power expected for the forecast wind.

15. The method as recited in claim 14, wherein the fault in a wind turbine is icing if the air temperature is below a first threshold and the humidity is above a second threshold.

16. The method as recited in claim 1, wherein said operating the component of the wind turbine farm further comprises dispatching a servicing platform to a wind turbine due for service if the forecast wind in the geographic area of interest is below a threshold safe wind speed for the forecast time interval.

17. The method as recited in claim 1, wherein, said operating the component of the wind turbine farm further comprises operating a power grid to balance a supply and demand wherein the supply is based at least in part on the forecast wind.

18. A non-transitory computer-readable medium carrying one or more sequences of instructions, wherein execution of the one or more sequences of instructions by one or more processors causes the one or more processors to perform at least the steps at least of claim 1.

19. An apparatus comprising:

at least one processor; and at least one memory including one or more sequences of instructions, the at least one memory and the one or more sequences of instructions configured to, with the at least one processor, cause the apparatus to perform at least the steps of claim 1.

20. A system comprising:

a plurality of wind turbines;

a servicing platform;

at least one processor; and at least one memory including one or more sequences of instructions, the at least one memory and the one or more sequences of instructions configured to, with the at least one processor, cause the system to perform at least the steps of claim 1.

* * * * *